United States Patent
Bertrand et al.

(10) Patent No.: US 11,729,818 B2
(45) Date of Patent: *Aug. 15, 2023

(54) PREAMBLE GROUP SELECTION IN RANDOM ACCESS OF WIRELESS NETWORKS

(71) Applicant: TEXAS INSTRUMENTS INCORPORATED, Dallas, TX (US)

(72) Inventors: Pierre Bertrand, Antibes (FR); Shantanu Kangude, Dallas, TX (US); Zukang Shen, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,557

(22) Filed: Sep. 21, 2020

(65) Prior Publication Data
US 2021/0007133 A1    Jan. 7, 2021

Related U.S. Application Data

(60) Continuation of application No. 15/489,344, filed on Apr. 17, 2017, now Pat. No. 10,785,796, which is a
(Continued)

(51) Int. Cl.
*H04W 74/00* (2009.01)
*H04L 1/00* (2006.01)
(Continued)

(52) U.S. Cl.
CPC ......... *H04W 74/008* (2013.01); *H04L 1/0007* (2013.01); *H04L 27/2692* (2013.01);
(Continued)

(58) Field of Classification Search
CPC ........... H04W 74/008; H04W 28/0221; H04W 40/08; H04W 52/04; H04W 72/0473;
(Continued)

(56) References Cited

U.S. PATENT DOCUMENTS 6,405,046 B1   6/2002   Kumaran et al.
6,775,548 B1   8/2004   Rong et al.
(Continued)

FOREIGN PATENT DOCUMENTS

WO    2008055235 A2    5/2008

OTHER PUBLICATIONS

3GPP, 3rd Generation Partnership Project; Technical Specification Group Radio Access Network WG1 (TSG RAN WG1); "Coverage Comparison Between PUSCH, PUCCH and RACH", 3GPP R1-081461, Meeting #52bis, Shenzhen China, Mar. 31-Apr. 4, 2008 (2 pages).
(Continued)

*Primary Examiner* — Steven H Nguyen
(74) *Attorney, Agent, or Firm* — Gregory J. Albin; Frank D. Cimino

(57) ABSTRACT

A transport block size (TBS) of a first uplink message (RACH Msg3) transmitted on a Physical Uplink Shared Channel (PUSCH) during a random access procedure in a User Equipment (UE) accessing a radio access network may be determined by receiving a pathloss threshold parameter. A downlink pathloss value indicative of radio link conditions between the UE and a base station (eNB) serving the UE is then determined. A smaller value of TBS is selected from a set of TBS values if the determined pathloss value is greater than an operating power level of the UE minus the pathloss threshold parameter. A larger value of TBS is selected if the pathloss value is less than the operating power level of the UE minus the pathloss threshold parameter and the TBS required to transmit the RACH Msg3 exceeds the smaller TBS value.

20 Claims, 6 Drawing Sheets

Related U.S. Application Data continuation of application No. 14/444,896, filed on Jul. 28, 2014, now Pat. No. 9,629,165, which is a division of application No. 13/413,450, filed on Mar. 6, 2012, now Pat. No. 8,792,377, which is a division of application No. 12/563,281, filed on Sep. 21, 2009, now Pat. No. 8,130,667.

(60) Provisional application No. 61/098,346, filed on Sep. 19, 2008.

(51) Int. Cl.
*H04W 74/08* (2009.01)
*H04W 72/044* (2023.01)
*H04L 27/26* (2006.01)
*H04W 28/02* (2009.01)
*H04W 40/08* (2009.01)
*H04W 52/04* (2009.01)
*H04W 72/08* (2009.01)
*H04L 27/00* (2006.01)

(52) U.S. Cl.
CPC ....... *H04W 28/0221* (2013.01); *H04W 40/08* (2013.01); *H04W 52/04* (2013.01); *H04W 72/0473* (2013.01); *H04W 74/002* (2013.01); *H04W 74/0833* (2013.01); *H04L 2027/0095* (2013.01); *H04W 72/085* (2013.01)

(58) Field of Classification Search
CPC ........... H04W 74/002; H04W 74/0833; H04W 72/085; H04L 1/0007; H04L 27/2692; H04L 2027/0095
See application file for complete search history.

(56) References Cited

U.S. PATENT DOCUMENTS

| | | | |
|---|---|---|---|
| 7,082,108 | B2 | 7/2006 | Hwang et al. |
| 7,096,274 | B1 | 8/2006 | Ci et al. |
| 7,363,049 | B2 | 4/2008 | Shin et al. |
| 7,983,230 | B1 | 7/2011 | Li et al. |
| 8,130,667 | B2 * | 3/2012 | Bertrand ............... H04L 1/0007 370/252 |
| 8,140,083 | B2 | 3/2012 | Fischer et al. |
| 8,406,255 | B2 | 3/2013 | Ozturk et al. |
| 8,451,781 | B2 | 5/2013 | Jeong et al. |
| 8,792,377 | B2 * | 7/2014 | Bertrand ............... H04W 40/08 370/252 |
| 9,629,165 | B2 | 4/2017 | Bertrand et al. |
| 2002/0181436 | A1 * | 12/2002 | Mueckenheim .... H04W 72/569 370/352 |
| 2008/0039129 | A1 | 2/2008 | Li et al. |
| 2008/0117843 | A1 * | 5/2008 | Ishii .................... H04W 52/286 370/310 |
| 2008/0130588 | A1 | 6/2008 | Jeong et al. |
| 2008/0188260 | A1 | 8/2008 | Xiao et al. |
| 2009/0011714 | A1 * | 1/2009 | Hozumi ............... H04B 7/0877 455/67.11 |
| 2009/0042582 | A1 | 2/2009 | Wang et al. |
| 2009/0082058 | A1 * | 3/2009 | Ishizaki ................ H04W 52/20 455/522 |
| 2009/0088178 | A1 | 4/2009 | Jugl et al. |
| 2009/0103511 | A1 | 4/2009 | Marinier et al. |
| 2009/0175187 | A1 | 7/2009 | Jersenius et al. |
| 2009/0176525 | A1 | 7/2009 | Wang et al. |
| 2009/0225701 | A1 | 9/2009 | Kwon et al. |
| 2009/0286566 | A1 | 11/2009 | Lindholm et al. |
| 2010/0029282 | A1 | 2/2010 | Stamoulis et al. |
| 2010/0056061 | A1 | 3/2010 | Luo et al. |
| 2010/0091725 | A1 | 4/2010 | Ishii |
| 2010/0093386 | A1 | 4/2010 | Damnjanovic et al. |
| 2010/0099449 | A1 | 4/2010 | Borran et al. |
| 2010/0195636 | A1 | 8/2010 | Nakashima et al. |
| 2010/0281333 | A1 | 11/2010 | Jongren et al. |
| 2011/0124344 | A1 | 5/2011 | Gerstenberger et al. |

OTHER PUBLICATIONS

3GPP, 3rd Generation Partnership Project; Technical Specification Group Radio Access Network (TSG RAN); Change Request, "Processing of TPC Bits in the Random Access Response", 3GPP R1-083462, Meeting #54, Jeju, Korea, Aug. 18-22, 2008 (6 pages).

3GPP, 3rd Generation Partnership Project; Technical Specification Group Radio Access Network WG1 (TSG RAN WG1); "LS on RAN2 Decision to use Pathloss Parameter in the RACH Preamble Group Selections", 3GPP R1-083476, Meeting #54bis, Prague, Czech Republic, Sep. 29-Oct. 3, 2008, (2 pages).

3GPP, 3rd Generation Partnership Project; Technical Specification Group Radio Access Network WG1 (TSG RAN WG1); "On Pathloss usage for Preamble Group Selection", 3GPP R1-083516, #54bis, Prague, Czech Republic, Sep. 29-Oct. 3, 2008 (3 pages).

3GPP, 3rd Generation Partnership Project; Technical Specification Group Radio Access Network WG2 (TSG RAN WG2); "LS Response to LS on Information About New PDCCH Formal 1C and LS on SI Scheduling", 3GPP R2-084964, Meeting #63bis, Prague, Czech Republic, Sep. 29-Oct. 3, 2008 (2 pages).

3GPP, 3rd Generation Partnership Project; Technical Specification Group Radio Access Network WG2 (TSG RAN WG2); "LS on Preamble Group Selection Based on Radio Link Condition", 3GPP R2-087402, Meeting #64, Prague, Czech Republic, Nov. 10-24, 2008 (2 pages).

3GPP, 3rd Generation Partnership Project; Technical Specification Group Radio Access Network WG1 (TSG RAN WG1); "Radio-Link Criterion for Preamble Group Selection", 3GPP R1-090274, #55bis, Ljubljana, Slovenia, Jan. 12-16, 2009 (3 pages).

3GPP, 3rd Generation Partnership Project; Technical Specification Group Radio Access Network; Evolved Universal Terrestrial Access (E-UTRAN); "Medium Access Control (MAC) Protocol Specification", 3GPP TS 36.321, Release 8, V8.3.0, Valbonne, France, 2008-2009 (36 pages).

3GPP TS 36.321 V10.5.0 (Mar. 2012); 3rd Generation Partnership Project; Technical Specification Group Radio Access Network; Evolved Universal Terrestrial Access (E-UTRA); Medium Access Control (MAC) Protocol Specification Release 10) (54 pages).

3GPP TS 36.213 V10.5.0 (Mar. 2012); 3rd Generation Partnership Project; Technical Specification Group Radio Access Network; Evolved Universal Terrestrial Access (E-UTRA); Physical layer procedures (Release 10) (125 pages).

3GPP TS 36.214 V10.1.0 (Mar. 2011); 3rd Generation Partnership Project; Technical Specification Group Radio Access Network; Evolved Universal Terrestrial Access (E-UTRA); Physical layer; Measurements; (Release 10) (13 pages).

ETSI TS 136 331 V10.5.0 (Mar. 2012); LTE; Evolved Universal Terrestrial Access (E-UTRA); Radio Resource Control (RRC); Protocol Specification (3GPP TS 36.331 version 10.5.0; (Release 10) (306 pages).

Tomic, Igor A., "Calibration of CQI Reporting Algorithm in HSDPA networks", 15th Telecommunications Forum TELFOR 2007, p. 191-194, Nov. 20-22, 2007, Serbia Belgrade.

Prosecution History, U.S. Appl. No. 12/563,281, filed Sep. 21, 2009, 251 pages.

Prosecution History, U.S. Appl. No. 13/413,450, filed Mar. 6, 2012, 149 pages.

Prosecution History, U.S. Appl. No. 14/444,896, filed Jul. 28, 2014, 361 pages.

Prosecution History, U.S. Appl. No. 15/489,344, filed Apr. 17, 2017, 256 pages.

3rd Generation Partnership Project; Technical Specification Group Radio Access Network; Evolved Universal Terrestrial Radio Access (E-UTRA) Medium Access Control (MAC) Protocol Specification (Release 8); 3GPP TS 36.321; V.8.2.0; May 2008; 33 pages.

3rd Generation Partnership Project; Technical Specification Group Radio Access Network; Evolved Universal Terrestrial Radio Access

(56) References Cited

OTHER PUBLICATIONS (E-UTRA) Radio Resource Control (RRC) Protocol Specification (Release 8); 3GPP TS 36.331; V.8.2.0; May 2008; 151 pages.
"PC of RACH Message 3," 3GPP TSG-RAN WG1 Meeting #53bis; R1-083096; Nokia Siemens Networks, Nokia Corporation; Jeju, Korea, Aug. 18-22, 2008, 9 pages.
"Processing of TPC Bits in the Random Access Response," 3GPP TSG-RAN Meeting #54; R1-083462; Nokia, Siemens Networks, Ericsson, LGE, Nokia, Samsung; Jeju, Korea, Aug. 18-22, 2008, 7 pages.
"RACH Partitioning," 3GPP TSG-RAN WG2 Meeting #63; R1-084275; Nokia Corporation, Nokia Siemens Networks Jeju, Korea; Aug. 18-22, 2008; 4 pages.
Lindholm, Jari, Email to 3GPP RAN1 working group (3GPP_TSG_RAN_WG1) dated Sep. 5, 2008, Re: [LTE 54/14] Processig for TPC bits for PRACH, available at: https://list.etsi.org/scripts/wa.exe?A2=3GPP_TSG_RAN_WG1;385f085.0809A&S, Sep. 5, 2008 (8 pages).
"Uplink Power Control for E-UTRA—Comments on Open Issues," TSG-RAN WG1 #50, R1-073744, Ericsson, Athens, Greece, Aug. 20-24, 2007; 5 pages.
"Corrections Relating to RACH Partitioning," 3GPP TSG-RAN2 Meeting #63; R2-084276; Nokia Corporation, Nokia Siemens Networks; Jeju, Korea; Aug. 18-22, 2008; 2 pages.

\* cited by examiner

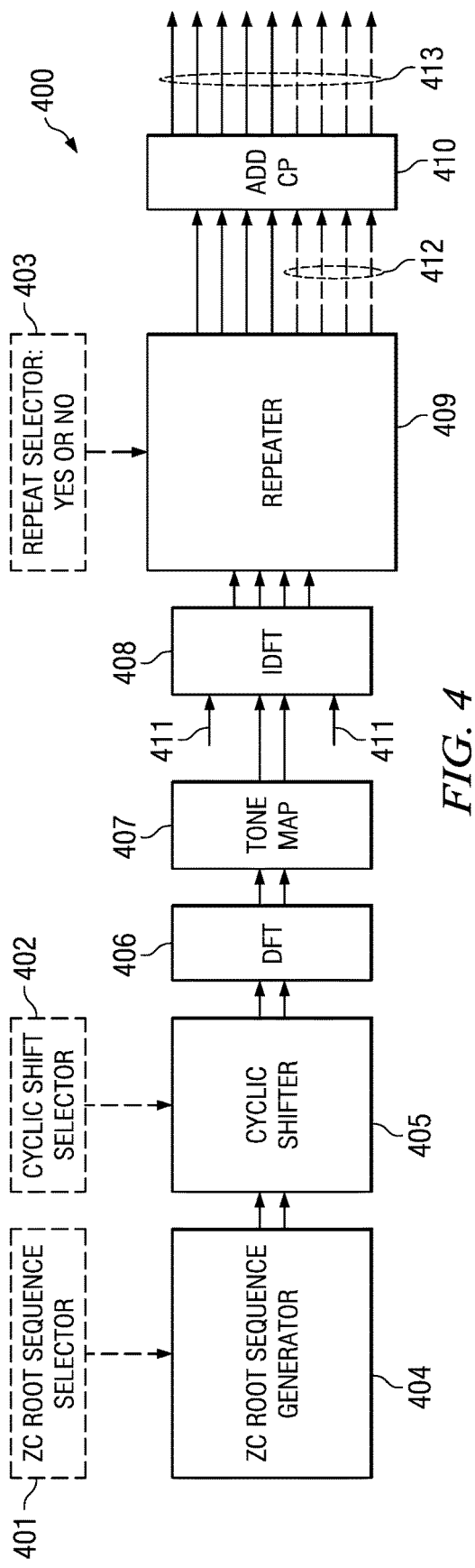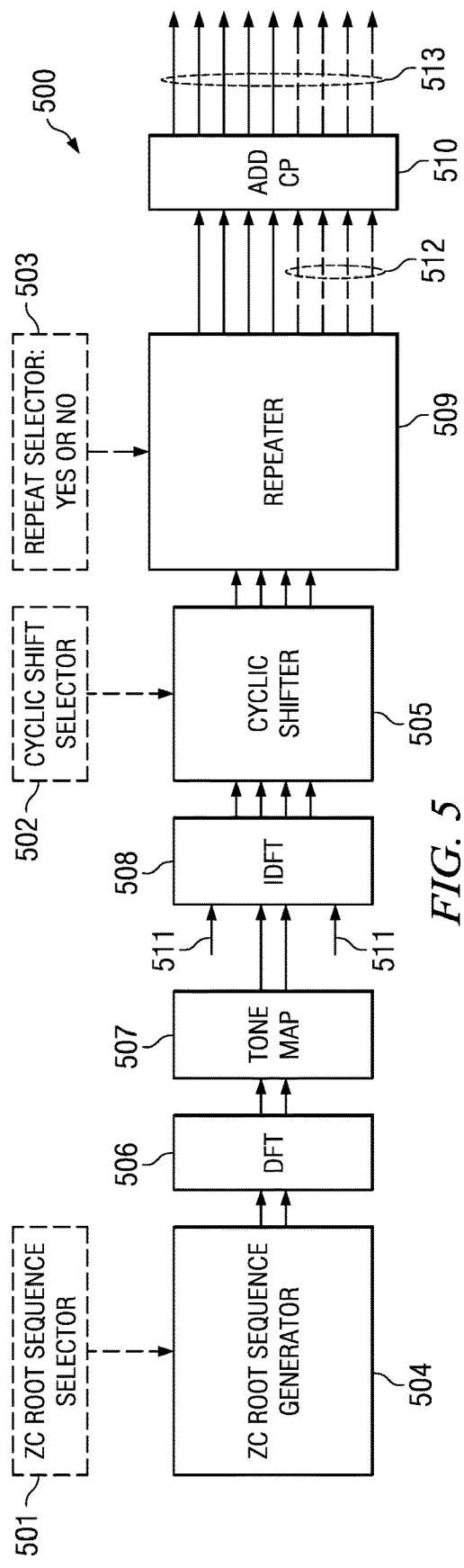

PREAMBLE GROUP SELECTION IN RANDOM ACCESS OF WIRELESS NETWORKS

This application is a continuation of application Ser. No. 15/489,344 filed Apr. 17, 2017, which is a continuation of application Ser. No. 14/444,896, filed Jul. 28, 2014 (now U.S. Pat. No. 9,629,165), which is a division of application Ser. No. 13/413,450, filed Mar. 6, 2012 (now U.S. Pat. No. 8,792,377), which is a division of application Ser. No. 12/563,281, filed Sep. 21, 2009 (now U.S. Pat. No. 8,130,667), which claims the benefit of U.S. Provisional Application No. 61/098,346, filed Sep. 19, 2008, and entitled "Preamble Group Selection in Random Access of Wireless Networks," which are incorporated herein by reference.

FIELD OF THE INVENTION

This invention generally relates to wireless cellular communication, and in particular non-synchronous random access transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. In general, NodeB hardware, when deployed, is fixed and stationary, while the UE hardware is portable.

In contrast to NodeB, the mobile UE can be portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA and SC-FDMA (single carrier FDMA) access schemes were chosen for the down-link (DL) and up-link (UL) of E-UTRA, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation (TS 36.211 Release 8, or later)." As improvements of networks are made, the NodeB functionality evolves; a NodeB in the EUTRA environment is also referred to as an evolved NodeB (eNB).

Random access transmission denotes a transmission by the mobile terminal, of at least one signal, from a plurality of pre-defined signals. The plurality of pre-defined signals is specified by the random access structure. Random access transmissions may also be referred to as ranging transmissions, or any other analogous term which typically designates an autonomously initiated transmission by a mobile UE. Random access transmissions are incorporated in practically all wireless cellular standards, including EUTRA, 802.16, etc.

User Equipment may be either up-link ("UL") synchronized or UL non-synchronized. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the invention. For example, the non-synchronized random access allows the access point ("Node B") to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures. A Node B is generally a fixed station and may be called a base transceiver system (BTS), an access point, a base station, or various other names.

As wireless systems proliferate, the expanding user base and the demand for new services necessitate the development of technologies capable of meeting users' ever increasing expectations. Users of mobile telecommunications devices expect not only globally available reliable voice communications, but a variety of data services, such as email, text messaging, and internet access. These factors conjoin to compel collaboration between telecommunications service providers in the development of advanced telecommunications technologies.

Consequently, the random access channel is intended to encompass a wider range of functionalities than in previous or current cellular networks, thus increasing its expected load. Further, the random access signal, through which the UE initiates the random access procedure, must reliably accommodate variable cell sizes, and provide the Node B with sufficient information to effectively prioritize resource requests. Also, because of its potentially non-synchronized nature, the random access signal must be designed to minimize interference with other UL (nearly) orthogonal transmissions.

The random access signal is based on a preamble based physical structure of the PRACH. A number of available preambles are provided that can be used concurrently to minimize the collision probability between UEs accessing the PRACH in a contention-based manner. The signatures for random access preambles are partitioned into two configurable-size groups, enabling carrying 1-bit of information on the preamble. This information indicates to the eNB the preferred size of the first post-preamble PUSCH transmission, chosen by the UE from among two possible sizes based on the amount of data available for transmission and the radio conditions. 3GPP Document R1-083476 suggests use of a Pathloss measurement as a radio-link metric for preamble group selection in the Random Access procedure.

BRIEF DESCRIPTION OF THE DRAWINGS

Particular embodiments in accordance with the invention will now be described, by way of example only, and with reference to the accompanying drawings, in which:

FIG. 4 shows a first illustrative embodiment of random access signal transmitter;

FIG. 5 shows a second illustrative embodiment of a random access signal transmitter;

DETAILED DESCRIPTION OF EMBODIMENTS OF THE INVENTION

Figure 1:
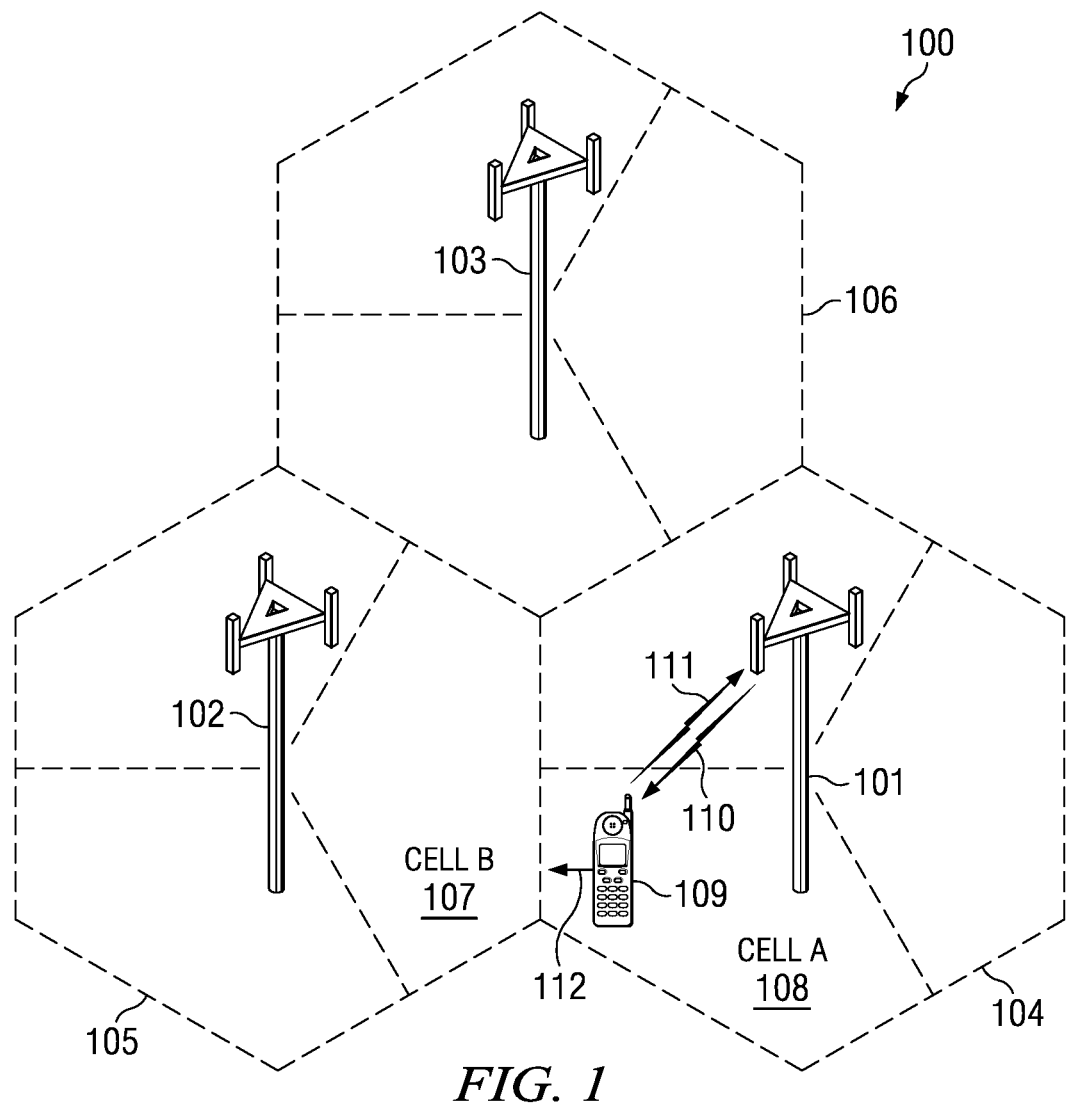
FIG. 1 shows an illustrative telecommunications network.

Most of the time, the eNB is not aware of the use-case that triggered a Random Access procedure, nor is it aware of the UE's buffer status. In absence of any information, the eNB can only allocate blindly one single standard resource for the first transmission on the PUSCH following a successful RACH preamble attempt, also referred to as message 3 of the Random Access procedure. The maximum message 3 size a cell-edge UE can afford in the worst-case coverage situation is 80 bits. It is generally agreed that this particular transmission sets the limits of the overall LTE UL coverage. However, even in such a scenario, it would be unnecessarily restrictive to impose this unique minimum transport block size (TBS) for message 3 to all UEs in the cell. As a result, two message sizes, or TBSs, are considered for message 3, namely a "smaller" message size, MESSAGE_SIZE_GROUP_A, and a "larger" message size, MESSAGE_SIZE_GROUP_B, as defined in 3GPP TS 36.321, Technical Specification Group Radio Access Network; Evolved Universal Terrestrial Radio Access (E-UTRA); "Medium Access Control (MAC) protocol specification (Release 8)." Only MESSAGE_SIZE_GROUP_A needs to be either broadcast on a system information block (SIB) or hard-coded in the specification. The UE indicates which of the two TBSs is more appropriate based on both the amount of data available for transmission and the radio conditions. For the latter aspect, it is agreed that the Pathloss measurement would be used as radio-link metric. The power control setting of message 3, can be summarized as follows:

$$P_{msg\ 3} = \min\begin{cases} P_{MAX}; 10\ \log_{10}(N_{RB}) + P_{0\_PRE} + \\ \Delta_{PREAMBLE-Msg\ 3} + PL + \Delta_{TF} + \Delta P_{rampup} + \delta_{msg\ 2} \end{cases} \quad (1)$$

where:

$P_{msg3}$ is the UE's transmit power for message 3 transmission $P_{MAX}$ is the maximum allowed power that depends on the UE power class $N_{RB}$ is the number of RBs allocated on PUSCH to message 3

$P_{0\_PRE}$ is the initial target received preamble power at eNB antenna port $\Delta_{PREAMBLE-Msg3}$ is the nominal power gap between the preamble and message 3, signaled by the eNB PL is the downlink pathloss estimate calculated in the UE $\Delta P_{rampup}$ is the power offset reflecting the accumulated optional power rampup of the preamble during potential retries $\delta_{msg2}$ is the TPC command indicated in the random access response ΔTF is an optional MCS-dependent power offset defined as:

$$\begin{cases} \Delta_{TF} = 10\ \log_{10}(2^{1.25MPR} - 1) \\ MPR = TBS/N_{RE} \\ N_{RE} = 2N_{RB} \cdot N_{sc}^{RB} \cdot N_{symb}^{UL} \end{cases} \quad (2)$$

where:

MPR is the modulation power ratio, $N_{RE}$ is the number of resource elements available in the allocated message 3 resource.

$\Delta_{TF}$ is a function of both the TBS and the number of allocated RBs.

The aim of setting the TBS of message 3 based on radio-link conditions is to prevent from choosing larger message 3 TBS, MESSAGE_SIZE_GROUP_B, leading to a required transmit power exceeding the maximum allowed power, $P_{MAX}$. In other words, the larger message 3 size, MESSAGE_SIZE_GROUP_B, should only be selected by the UE under the following condition:

$$10\ \log_{10}(N_{RB\_2}) + P_{0\_PRE} + \Delta_{PREMBLE-Msg3} + PL + \Delta_{TF\_2} + \Delta P_{rampup} + \delta_{msg2} < P_{MAX} \quad (3)$$

where $N_{RB\text{-}2}$ and $\Delta_{TF\text{-}2}$ are the number of RBs and the MCS-dependent power offset of message 3 of size MESSAGE_SIZE_GROUP_B.

This translates into the following threshold on Pathloss, PARTITION_PATHLOSS_THRESHOLD, beyond which a MESSAGE_SIZE_GROUP_A preamble group should always be selected:

$$\text{PARTITION\_PATHLOSS\_THRESHOLD} = \quad (4)$$

$$\underbrace{P_{MAX} - P_{0\_PRE} - \Delta_{PREAMBLE}\text{-}Msg\ 3 -}_{\text{known before msg 3 allocation}}$$

$$\underbrace{\Delta_{TF\_2} - \Delta P_{rampup} - \delta_{msg\ 2} - 10\ \log_{10}(N_{RB\_2})}_{\text{unknown before msg 3 allocation}}$$

Where the first grouping of terms in Equation (4), known before msg3 allocation, defines the operating power level of the UE to be $P_{MAX} - P_{0\_PRE} - \Delta_{PREAMBLE\text{-}Msg3}$.

As shown in Equation (4), part of the information related to the message 3 allocation is not available at the UE when it prepares for preamble transmission, as follows:

$N_{RB\text{-}2}$: here it is questionable why the eNB would use a different number of RBs when allocating different messages 3 of MESSAGE_SIZE_GROUP_B size. Practically, a common sense allocation will consist in using 1-RB allocation for MESSAGE_SIZE_GROUP_A and 2-RB allocation for MESSAGE_SIZE_ GROUP_B. Some flexibility may be used to allow for different settings in different cells or at different times, but such flexibility does not seem to be justified on a sub-frame basis. Therefore, in at least some embodiments $N_{RB-2}$ is treated as a semi-static parameter in the eNB.

$\Delta_{TF-2}$, when applied, is a function defined by equation (2) of MESSAGE_SIZE_GROUP_B and the number of allocated RBs for message 3, $N_{RB-2}$, so given MESSAGE_SIZE_GROUP_B is known, by the eNB, the same above discussion on $N_{RB-2}$ applies.

$\Delta P_{rampup}$: RAN4 has specified conformance tests on the PRACH preamble choosing an operational point for the probability of missed detection of 1%, as defined in 3GPP TS 36.104 v8.2.0 (2008-05), Technical Specification Group Radio Access Network; Evolved Universal Terrestrial Radio Access (E-UTRA); "Base Station (BS) radio transmission and reception" (Release 8). Under this assumption, only 1% of preambles will ramp-up their power, which can be neglected here.

$\delta_{msg2}$: this is TPC command conveyed by Random Access Response (RAR) that neither the UE nor the eNB can predict before preamble transmission. Ignoring this parameter only has a coverage impact for message 3 when $\delta_{msg2}>0$, i.e. the TPC requests the UE to increase its power for message 3 transmission, which may cause erroneous MESSAGE_SIZE_GROUP_B selection when MESSAGE_SIZE_GROUP_A would have been safer. However the percentage of occurrence of this event depends on the range of $\delta_{msg2}$ which currently does not exceed 8 dB on the positive side. It is believed that a cautious usage of $\delta_{msg2}$ should be foreseen anyway as, in most practical cases, the instantaneous fading nature of the preamble disallows any accurate long-term power estimation. To be conservative, some Pathloss margin should be provisioned for this potential correction.

Therefore, the above information can be signaled by the eNB in a single parameter not exceeding 2-3 bits, referred to as RACH_MSG3_THRESHOLD, computed as follows:

$$\text{RACH\_MSG3\_THRESHOLD} = \Delta_{TF\_2} + 10 \log_{10}(N_{RB\_2}) + \text{margin} \quad (5)$$

It follows that the resulting condition under which the UE can select MESSAGE_SIZE_GROUP_B size for message 3 transmission is:

$$\begin{cases} PL < \text{PARTITION\_PATHLOSS\_THRESHOLD} \\ \text{with:} \\ \text{PARTITION\_PATHLOSS\_THRESHOLD} = \\ P_{MAX} - P_{0\_PRE} - \Delta_{PREAMBLE-Msg\,3} - \text{RACH\_MSG3\_THRESHOLD} \end{cases} \quad (6)$$

where the terms at the right side of the equation are all available at the UE before preamble transmission. The parameter RACH_MSG3_THRESHOLD should not exceed 2-3 bits and is either broadcasted on SIB or hard-coded in the specification. The former case provides some flexibility to the network in using different values for MESSAGE_SIZE_GROUP_B and $N_{RB-2}$ at different times and in different cells. In the latter case, the value of RACH_MSG3_THRESHOLD should be specified based on the TS 36.321 specification using a default value for MESSAGE_SIZE_GROUP_B and $N_{RB-2}$.

In some embodiments, RACH_MSG3_THRESHOLD is referred to as messagePowerOffsetGroupB and $N_{RB-2}$, $\Delta_{TF-2}$ are referred to as $N_{RB-B}$ and $\Delta_{TF-B}$ respectively.

Table 1 provides a range of values of this parameter, computed according to Equation (7), when considering MESSAGE_SIZE_GROUP_B ranging from 104 bits (1 RB, QPSK) up to 1544 bits (5 RBs, 64QAM), which is considered to be sufficient to cover the range of message 3 TBSs when coverage restrictions apply. This range also reflects the limited TBS range of Msg3 (TBS index $I_{TBS} \leq 15$), resulting from the truncated modulation and coding scheme field as defined in R2-084964/R1-083431, "LS Reply to Uplink grant format in Random Access Response." As can be observed, messagePowerOffsetGroupB ranges from 0 dB up to 12 dB, which in an exemplary embodiment of Table 1 is extended to [0, 18] dB to include some margin.

TABLE 1

| messagePowerOffsetGroupB parameter values | | | | | | | | |
|---|---|---|---|---|---|---|---|---|
| Field value | 0 | 1 | 2 | 3 | 4 | 5 | 6 | 7 |
| Parameter value (dB) | $-\infty$ | 0 | 3 | 6 | 9 | 12 | 15 | 18 |

Note that the value of $-\infty$ is included to be compatible with an embodiment responsive to R2-087402/R1-090003, "LS on preamble group selection based on radio link condition."

Appendix A and Appendix B contain spreadsheets that illustrate calculation details that are used to select the values for Table 1. Appendix A provides a detailed range of values for messagePowerOffsetGroupB while Appendix B shows the benefit of the preamble group selection, and shows the limit where the maximum Tx power is reached when transmitting the larger message size, which is the limit by which UE should select the smaller message size.

FIG. 1 shows an exemplary wireless telecommunications network 100. The illustrative telecommunications network includes base stations 101, 102, and 103. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 can employ non-synchronized random access to initiate handover to base station 102.

The UE 109 can also employ non-synchronous random access to request allocation of up-link 111 time or frequency or code resources. If UE 109 has data ready for transmission, for example, traffic data, measurements report, tracking area update, etc., UE 109 can transmit a random access signal on up-link 111. The random access signal notifies base station 101 that UE 109 requires up-link resources to transmit its data. Base station 101 responds by transmitting to UE 109, via down-link 110, a message containing the parameters of the resources allocated for UE 109 up-link transmission along with a possible timing error correction. After receiving the resource allocation and a possible timing advance message transmitted on down-link 110 by base station 101, UE 109 (possibly) adjusts its transmit timing and transmits its data on up-link 111 employing the allotted resources during the prescribed time interval.

For a random access transmission, UE 109 selects a message 3 size to be conveyed to the NodeB by the random access signal as described above and with regard to equation 6.

Figure 2:
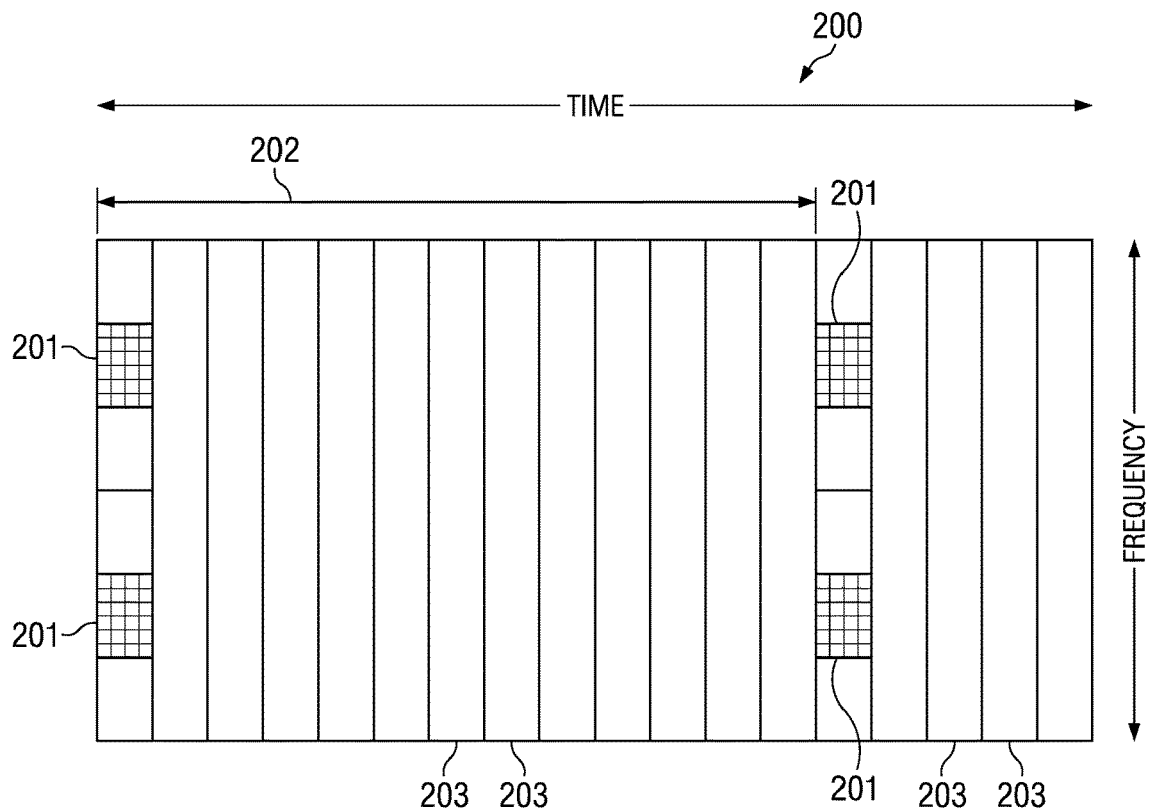
FIG. 2 shows an illustrative up-link time/frequency allocation.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201. In the illustration of FIG. 2, a single sub-frame supports two random access channels. Note that the illustrated number and spacing of random access channels is purely a matter of convenience; a particular transmission frame implementation may allocate more or less resources to random access channels. Including multiple random access channels allows multiple UEs to simultaneously transmit a random access signal without collision. However, because each UE independently chooses the random access channel on which it transmits, collisions between UE random access signals may occur and must be resolved.

Figure 3:
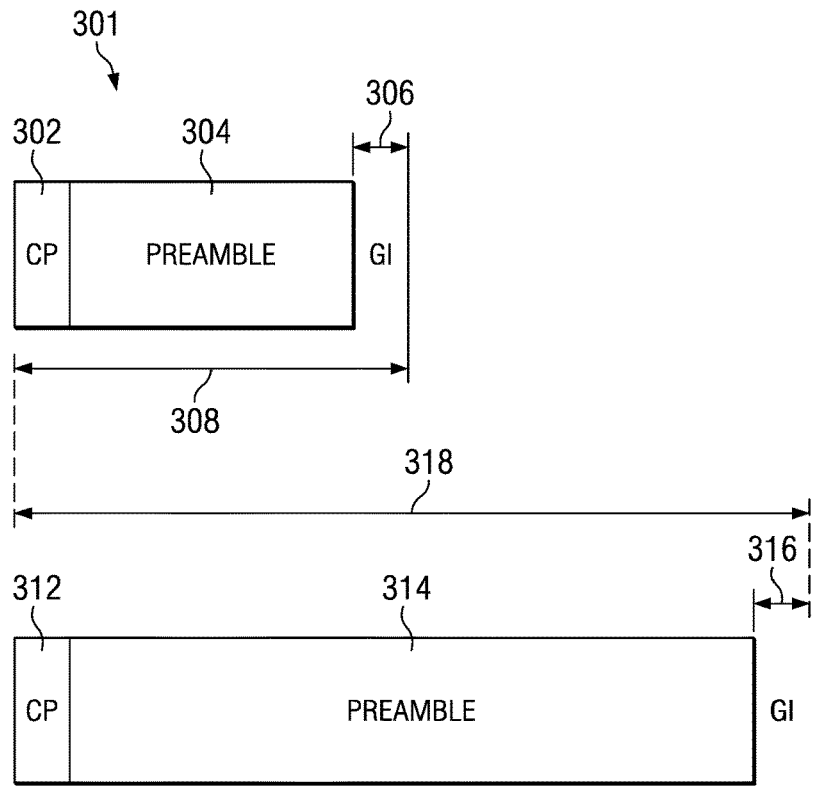
FIG. 3 shows illustrative 1 and 2 sub-frame random access signals.

FIG. 3 illustrates one embodiment of a random access signal. Random access signal 301 occupies a single sub-frame 308, while random access signal 311 occupies two sub-frames 318. In the illustrative embodiment of one sub-frame random access signal 301, duration 302 is included prior to transmission of random access preamble signal 304, to prevent interference between random access preamble signal 304 and any transmission on the random access preamble signal frequency bands during the previous sub-frame. This duration 302 may or may not be realized as a cyclic prefix ("CP") attached at the preamble start to allow simplified frequency-domain receiver implementation. Random access preamble signal 304 follows duration 302. Random access preamble signal 304 is designed to maximize the probability of preamble detection by the Node B and to minimize the probability of false preamble detections by the Node B, while maximizing the total number of resource opportunities. Similarly random access signal 311 includes cyclic prefix 312 and preamble 314 occupy two sub-frames 318.

Embodiments of the invention utilize CAZAC sequences to generate the random access preamble signal. CAZAC sequences are complex-valued sequences with following two properties: 1) constant amplitude (CA), and 2) zero cyclic autocorrelation (ZAC). Well-known examples of CAZAC sequences include (but are not limited to): Chu Sequences, Frank-Zadoff Sequences, Zadoff-Chu (ZC) Sequences, and Generalized Chirp-Like (GCL) Sequences.

As is well known in the art, Zadoff-Chu (ZC) sequences, as defined by:

$$aM(k)=\exp[j2\pi(M/N)[k(k+1)/2+qk]] \text{ for } N \text{ odd}$$

$$aM(k)=\exp[j2\pi(M/N)[k^2/2+qk]] \text{ for } N \text{ even}$$

are representative examples of CAZAC sequences. Alternative convention for ZC definition replaces "j" in the above formula by "−j." Either convention can be adopted. In the above formula, "M" and "N" are relatively prime, and "q" is any fixed integer. Also, "N" is the length of the sequence, "k" is the index of the sequence element (k is from {0, 1, . . . , N−1}), and "M" is the index of the root ZC sequence. Making "N" a prime number maximizes the set of non-orthogonal root ZC sequences having optimal cross-correlation. Thus, when "N" is prime, there are "(N−1)" possible choices for "M," where each choice results in a distinct root ZC CAZAC sequence. In this invention, terms: Zadoff-Chu, ZC, and ZC CAZAC, are used interchangeably. Term CAZAC denotes any CAZAC sequence, like ZC, or otherwise.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

In one embodiment of the invention, random access preamble signal 304 (or 314) is constructed from a constant amplitude zero autocorrelation ("CAZAC") sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in the primary embodiment of the invention, a UE constructs random access preamble signal (304 or 314), by selecting a CAZAC sequence, possibly performing a combination of described modifications to the selected CAZAC sequence, modulating the modified sequence, and transmitting the resulting random access signal over the air.

In practical systems, there is a need to specify or pre-define the set of allowed random access preamble signals. Thus, a UE autonomously selects (or can be allocated) at least one random access preamble signal from the pre-defined set of random access preamble signals. Consecutively, UE transmits the selected signal over the air. Node B searches within the finite pre-defined set of random access signals, and is therefore able to detect an occurrence of a random access transmission by the UE.

One method of pre-defining the set of random access preamble signals is to allow a choice of modifications to a fixed root CAZAC sequence, such as a ZC CAZAC sequence. For example, in one embodiment of the invention, distinct random access preamble signals are constructed by applying distinct cyclic shifts when performing the modification of a root CAZAC sequence. Thus, in this embodiment of the invention, UE autonomously selects the random preamble access signal by selecting a value for the cyclic shift. The selected value of the cyclic shift is applied during the process of modification of the root CAZAC sequence. For sequence [c(0) c(1) c(2) . . . c(L−1)], the corresponding cyclically shifted sequence is [c(n) c(n+1) c(n+2) . . . c(L−1) c(0) c(1) . . . c(n−1)], where "n" is the value of the cyclic shift. Thus, in this embodiment, the set of possible cyclic shifts defines the set of allowed random access preamble signals.

An alternate method of pre-defining the set of random access preamble signals is to permit a choice of used root CAZAC sequences, such as ZC sequences. For example, in this embodiment of the invention, distinct random access preamble signals are constructed by applying pre-defined common modifications to distinct root CAZAC sequences. Consequently, UE autonomously selects the random access preamble signal by selecting a distinct root CAZAC sequence, which it (UE) then modifies to produce the random access preamble signal. Thus, in this alternate embodiment of the invention, the set of allowed root CAZAC sequences also defines the set of allowed random access preamble signals.

In a general embodiment of the invention, the set of allowed random access preamble signals is defined by two sets: 1) set of allowed root CAZAC sequences, and 2) set of allowed modifications to a given root CAZAC sequence. For example, in this general embodiment of the invention, a random access preamble signal is constructed by first selecting the root ZC CAZAC sequence, and second, by selecting the value of the cyclic shift. Selections can be performed autonomously by the UE, and the UE applies the selected value of the cyclic shift during the process of modification of the selected root ZC CAZAC sequence.

FIG. 4 is a block diagram showing an apparatus in accordance with an embodiment of the invention. Apparatus 400 comprises ZC Root Sequence Selector 401, Cyclic Shift Selector 402, Repeat Selector 403, ZC Root Sequence Generator 404, Cyclic Shifter 405, DFT 406, Tone Map 407, other signals or zero-padding in 411, IDFT 408, Repeater 409, optional repeated samples 412, Add CP 410, and the random access signal 413. Elements of the apparatus may be implemented as components in a programmable processor. At times, the IDFT block 408 may be implemented using an Inverse Fast Fourier Transform (IFFT), and at times the DFT block 406 may be implemented using Fast Fourier Transform (FFT). Apparatus 400 is used to select and perform the random access preamble signal transmission as follows. The UE performs selection of the ZC CAZAC root sequence using ZC Root Sequence Selector 401 and the selection of the cyclic shift value using 402. Next, UE generates the ZC sequence using ZC Root Sequence Generator 404. Then, if necessary, the UE performs cyclic shifting of the selected ZC sequence using Cyclic Shifter 405. The UE performs DFT (Discrete Fourier Transform) of the cyclically shifted ZC sequence DFT 406. The result of the DFT operation is mapped onto designated set of tones (sub-carriers) using Tone Map 407. Additional signals or zero-padding signals 411, may or may not be present. The UE next performs IDFT of the mapped signal using IDFT 408. Size of the IDFT 408 can be bigger than the size of DFT 406. Block-Repetition of the IDFT-ed signal is optional, and performed using Repeater 409. Note that signals 412 represent optional repeated samples. This repetition can be applied when the preamble transmission occupies two or more sub-frames. An optional cyclic prefix (CP) can then be added using Add CP 410, to arrive at the random access signal 413. The random access signal 413 is transmitted over the air.

FIG. 5 is a block diagram showing an apparatus in accordance with an alternative embodiment of the invention. Apparatus 500 comprises ZC Root Sequence Selector 501, Cyclic Shift Selector 502, Repeat Selector 503, ZC Root Sequence Generator 504, Cyclic Shifter 505, DFT 506, Tone Map 507, other signals or zero-padding 511, IDFT 508, Repeater 509, optional repeated samples 512, Add CP 510, and the random access signal 513. Elements of the apparatus may be implemented as components in a programmable processor. At times, the IDFT 508 may be implemented using an Inverse Fast Fourier Transform (IFFT), and at times the DFT 506 may be implemented using Fast Fourier Transform (FFT). Apparatus 500 is used to select and perform the random access preamble signal transmission as follows. The UE performs selection of the ZC CAZAC root sequence using ZC Root Sequence Selector 501 and the selection of the cyclic shift value using Cyclic Shifter 502. Then, UE generates the ZC sequence using ZC Root Sequence Generator 504. The selected ZC sequence is transformed using DFT 506. The result of the DFT operation is then mapped onto designated set of tones (sub-carriers) using Tone Map 507. Additional signals or zero-padding 511, may or may not be present. The UE then performs IDFT of the mapped signal using IDFT 508. Using Cyclic Shifter 505, the selected value of the cyclic shift is then applied to the IDFT-ed signal. The value of the cyclic shift is obtained from 502. Block-Repetition of the cyclically shifted IDFT-ed signal is optional, and performed using 509. Note that 512 represent optional repeated samples. This repetition can be applied when the preamble transmission occupies two or more sub-frames. An optional cyclic prefix (CP) can then be added using 510, to arrive at the random access signal 513. The random access signal 513 is transmitted over the air.

Figure 6:
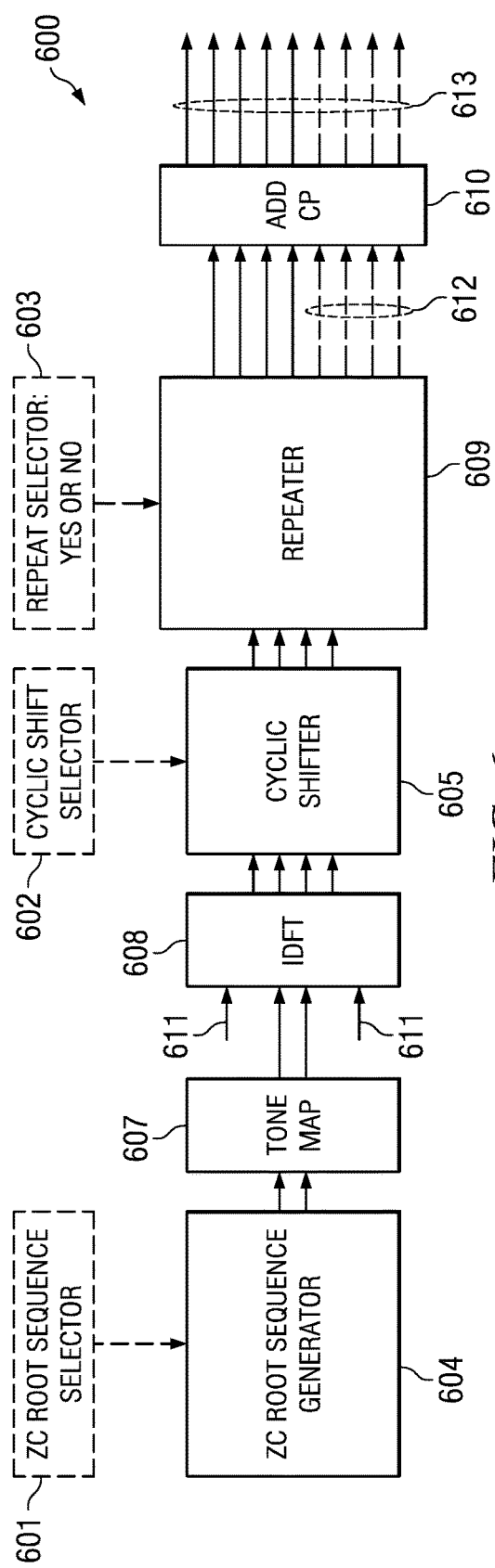
FIG. 6 shows a third illustrative embodiment of a random access signal transmitter.

FIG. 6 is a block diagram showing an apparatus in accordance with a third embodiment of the invention. Apparatus 600 comprises ZC Root Sequence Selector 601, Cyclic Shift Selector 602, Repeat Selector 603, ZC Root Sequence Generator 604, Cyclic Shifter 605, Tone Map 607, other signals or zero-padding in 611, IDFT 608, Repeater 609, optional repeated samples 612, Add CP 610, and the random access signal 613. Elements of the apparatus may be implemented as components in a programmable processor. At times, the IDFT 608 may be implemented using an Inverse Fast Fourier Transform (IFFT). Apparatus 600 is used to select and perform the random access preamble signal transmission as follows. The UE performs selection of the ZC CAZAC root sequence using ZC Root Sequence Selector 601 and the selection of the cyclic shift value using Cyclic Shift Selector 602. Then, UE generates the ZC sequence using ZC Root Sequence Generator 604. Selected ZC sequence is mapped onto designated set of tones (sub-carriers) using Tone Map 607. Additional signals or zero-padding signals 611, may or may not be present. The UE then performs IDFT of the mapped signal using IDFT 608. Using Cyclic Shifter 605, the selected value of the cyclic shift is applied to the IDFT-ed signal. Value of the cyclic shift is obtained from Cyclic Shift Selector 602. Block-Repetition of the cyclically shifted IDFT-ed signal is optional, and performed using Repeater 609. Note that signals 612 represent optional repeated samples. This repetition can be applied when the preamble transmission occupies two or more sub-frames. An optional cyclic prefix (CP) can then be added using Add CP 610, to arrive at the random access signal 613. The random access signal 613 is then transmitted over the air.

In all embodiments of the invention, the set of allowed cyclic shifts can be dimensioned in accordance with the physical limitations of the cell, which include cells maximum round trip delay plus the delay spread of the channel. For example, a single root ZC CAZAC sequence may be cyclically shifted by any integer multiple of the cell's maximum round trip delay plus the delay spread, to generate a set of pre-defined random access preamble signals. The maximum round trip delay plus the delay spread of the channel must be converted to the sampling unit of the sequence. Thus, if the maximum round trip plus the delay spread of the channel is given as "x," then possible choices for cyclic shift values can be dimensioned as n from $\{0, x, 2x, \ldots, (u-1)x\}$ where ux can't exceed the length of the sequence which is being cyclically shifted.

Round trip delay is a function of cell size, where cell size is defined as the maximum distance d at which a UE can interact with the cell's base station, and can be approximated using the formula t=6.67d, where t and d are expressed in µs and km respectively. The round-trip delay is the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 µs may be considered a conservative value thereof.

When the set $\{0, x, 2x, \ldots, (u-1)x\}$ of cyclic shift values generates an insufficient number of distinct random access preamble signals, then additional root ZC CAZAC sequences (for example, for M=2 and M=3) can be employed for random access preamble signal generation. In this situation, selection of prime N shows to be advantageous, because in that case, the set of all possible choices for M is $\{1, 2, \ldots, (N-1)\}$. Thus, in one embodiment of the invention, distinct random access preamble signals are identified by the set of all possible choices for the cyclic shift value and the set of allowed choices for M. In addition to providing supplementary intra-cell sequences, when used in neighboring cells, these additional root ZC CAZAC sequences provide good inter-cell interference mitigation. Thus, during the cellular system design, a scenario where adjacent cells use identical root sequences should be avoided. This can be achieved through a number of possible techniques, including but not limited to: cellular system planning, sequence hopping, or a combination thereof.

The set of allowed random access preamble signals must be revealed to the UE prior to the random access transmission. This can be achieved in a number of different ways, including hard-wiring this information in the UE. The preferred approach, however, is for the Node B to broadcast information which allows the UE to infer the set of allowed random access preamble signals. For example, the Node B can broadcast: 1) which root CAZAC sequences are permitted, and 2) which values of the "cyclic-shift" are permitted. The UE reads the broadcasted information, infers the allowed set of random access preamble signals, selects at least one signal from the set, and performs the random access transmission. Note that the selection of the random access preamble signal amounts to the selection of the root ZC CAZAC sequence, the selection of the value of the cyclic shift, and possibly the selection of the frequency bin (in case multiple bins are configured per random access time slot). In certain cases, additional broadcasted information may be required, such as whether or not the UE needs to perform signal repetition of or not. Overall, this approach, based on broadcasting the required information, is preferred, because it allows for optimizing the cellular network based on physical limitations, such as the cell-size. Any given UE is then flexible enough to be used in all types of cells, and system optimization is performed by the cell design.

Sequences obtained from cyclic shifts of a single CAZAC root sequence (ZC or otherwise) are orthogonal to one another if the cyclic shift value is larger than the maximum time uncertainty of the received signal, including the delay spread and the spill-over. In other words, the cyclic shifts create zones with zero correlation between distinct random access preamble signals. Thus, a cyclically shifted sequence can be observed without any interference from sequences created using different cyclic shifts. Sequences obtained from cyclic shifts of different Zadoff-Chu (ZC) sequences are not orthogonal, but have optimal cross-correlation as long as the sequence length is a prime number. Therefore, it is recommended that orthogonal sequences should be favored over non-orthogonal sequences. For this reason, additional Zadoff-Chu (ZC) root sequences should be used only when the required number of sequences cannot be generated by cyclic shifts of a single root sequence. As a result, cyclic shift dimensioning is of primary importance in the random access sequence design. As mentioned above, the cyclic shift value is dimensioned to account for the maximum time uncertainty in random access preamble reception. This time uncertainty reflects the Node B-UE-Node B signal propagation delay ("round-trip time") plus the delay spread. Thus, cyclic shift dimensioning ensures that distinct random access signals, generated from a single root CAZAC sequence, are received within the zone of zero mutual correlation. Although delay spread can be assumed to be constant, signal round-trip time depends on the cell size. Thus, the larger the cell, the larger the cyclic shift required to generate orthogonal sequences, and correspondingly, the larger the number of Zadoff-Chu (ZC) root sequences necessary to provide the required number of sequences.

Table 2 provides an example of random access preamble sequence design for different cell sizes. Table 2 illustrates how the number of required root ZC CAZAC sequences increases from 1 to 8, when the cell size is increased from 0.8 km (Cell Scenario 1) to 13.9 km (Cell Scenario 4). Table 2 is derived using following parameters: Maximum delay spread is 5 µsec, root ZC CAZAC sequence length is 863 samples, preamble sampling rate is 1.07875 MHz, and spill-over guard period is 2 samples. Because the expected inter-cell interference and load (user density) increases as cell size decreases, smaller cells need more protection from co-preamble interference than larger cells. Thus, the relationship between cell size and the required number of Zadoff-Chu (ZC) root sequences allows for system optimization, and the Node B should configure the primitive cyclic shift to be used in each cell independently. The set of used cyclic shifts values is then built as integral multiples of the primitive cyclic shift value. As shown in Table 2, this can be done either by configuring either the primitive cyclic shift value, or by configuring the number of different root Zadoff-Chu (ZC) sequences to be used in a cell. This configurability provides the benefit of providing a constant number of distinct random access preamble signals irrespective of the cell size, which simplifies the specification of the Medium Access Control (MAC) procedure

TABLE 2

Cell Scenarios With Respect to Different Cyclic Shift Increments

| Cellular Scenario Index | Cell Size [km] | Number of Distinct Random Access Preamble Signals | Number Of Used Root ZC CAZAC Sequences | Number of Used Cyclic Shifts Per ZC Sequence | Primitive Cyclic Shift Value [samples] |
|---|---|---|---|---|---|
| 1 | 0.8 | 64 | 1 | 64 | 13 |
| 2 | 2.6 | 64 | 2 | 32 | 26 |
| 3 | 6.3 | 64 | 4 | 16 | 53 |
| 4 | 13.9 | 64 | 8 | 8 | 107 |

Figure 7:
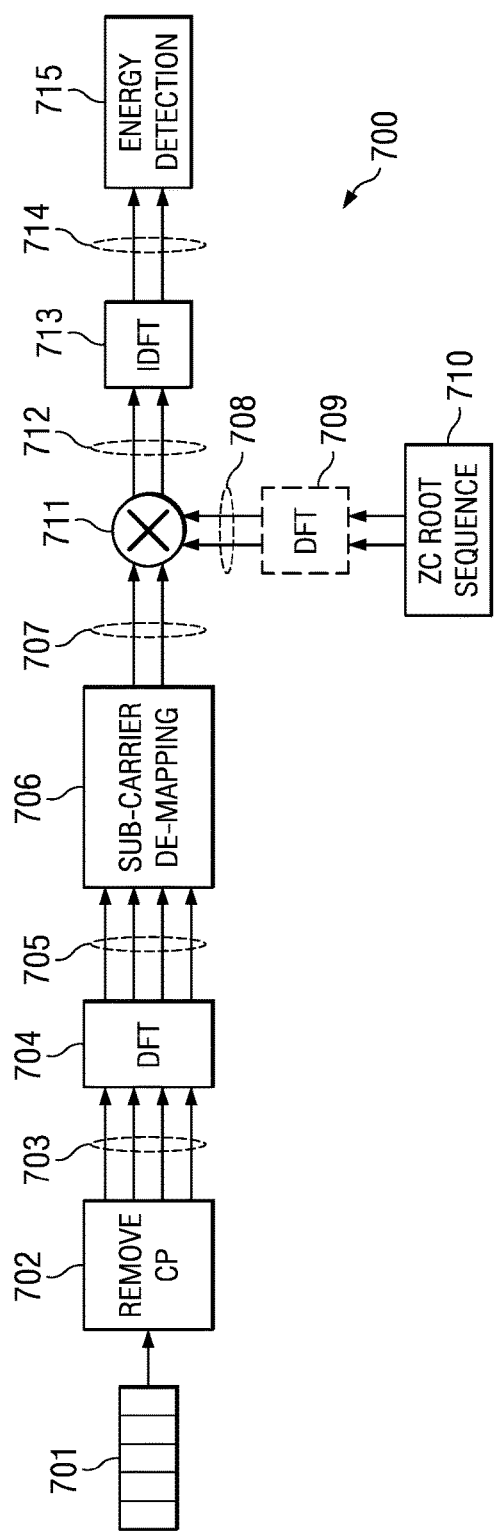
FIG. 7 shows an illustrative non-synchronous random access signal receiver.

FIG. 7 shows an embodiment of a random access signal receiver. This receiver advantageously makes use of the time and frequency domain transforming components used to map and de-map data blocks in the SC-FDMA up-link sub-frame. The received random access signal 701 comprising cyclic prefix and random access preamble signal is input to cyclic prefix removal component 702 which strips cyclic prefix from the random access signal producing signal 703. Frequency domain transforming component 704 is coupled to cyclic prefix removal component 702. Frequency domain transforming component 704 converts signal 703 into sub-carrier mapped frequency tones 705. Sub-carrier de-mapping component 706 is coupled to frequency domain transforming component 704. Sub-carrier de-mapping component 706 de-maps sub-carrier mapped frequency tones 705 to produce useful frequency tones 707. Product component 711 is coupled to both sub-carrier de-mapping component 706 and the complex conjugation component 709. Frequency domain transforming component 709 converts a preamble root sequence 710, such as a prime length Zadoff-Chu sequence, into a corresponding set of preamble frequency tones 708. Product component 711 computes a tone by tone complex multiplication of received frequency tones 707 with samples 708 to produce a set of frequency tones 712. Time domain transforming component 713 is coupled to product component 711. Time domain transforming component 713 converts multiplied frequency tones 712 into correlated time signal 714. Correlated time signal 714 contains concatenated power delay profiles of all cyclic shift replicas of the preamble root sequence 710. Energy detection block 715 is coupled to time domain transforming block 713. Energy detection block 715 identifies received preamble sequences by detecting the time of peak correlation between received random access signal 701 and preamble root sequence 710. Note that DFT 709 is required when the corresponding transmitter diagram is given as in either FIG. 4, or as in FIG. 5. In case that transmitter diagram is as in FIG. 6, the DFT 709 is omitted.

As pointed out earlier, a prime length preamble sequence is recommended for use with the SC-FDMA up-link transmitter system. To achieve this, following steps can be taken. Preamble duration Tp is selected to optimize cell coverage (cell size, noise and interference conditions), and to be an integer multiple of the SC-FDMA data block duration. A reference length Npi=Tp×Rsi samples is selected, where Rsi is the allocated random access signal bandwidth, which is not used by data transmissions. Preamble sequence is then generated with sequence length corresponding to the largest prime number Np which is less than reference length Npi. Thus, since preamble duration remains Tp, preamble sampling rate becomes Rsi×Np/Npi. Because Npi sub-carriers are allocated to the random-access channel, and the preamble was shortened to the nearest lower prime number of samples (Np), there are unused sub-carriers that may be zeroed and distributed outside the preamble sub-carriers to isolate the preamble from the surrounding frequency bands.

Figure 8:
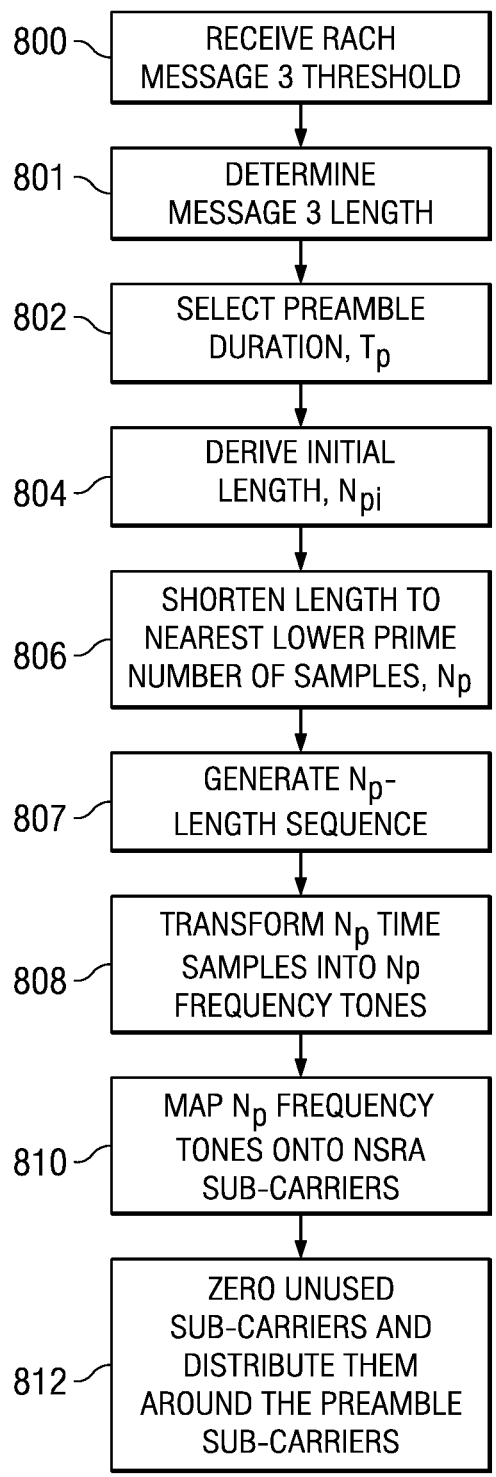
FIG. 8 shows a flow diagram of an illustrative random access preamble signal length adjustment and transmission method.

FIG. 8 shows a flow diagram of an illustrative method for constructing a prime length sequence for use with an SC-FDMA up-link transmitter. In block 800, a RACH message 3 threshold value encoded as a 2 or three bit value is received from the serving NodeB via an SIB. The threshold value is calculated by the NodeB as described with respect to equation 5. The UE then uses the threshold value to determine in block 801 its requested message 3 length as described in more detail with regard to equation 6. Since there are two choices for the message 3 length, the UE forms the preamble by selecting from one of two defined sets of sequences in order to convey the preferred message 3 size to the NodeB.

In block 802, a preamble duration $T_p$ is selected. $T_p$ is an integer multiple of the SC-FDMA up-link data block duration.

In block 804, a reference length is derived. This reference length is $N_{pi}$ samples, where $N_{pi}=T_p \times R_{si}$, and $R_{si}$ is the allocated random access signal bandwidth. In block 806, the reference length derived in block 804 is shortened to the nearest lower prime number of samples, $N_p$. In block 807, the $N_p$-length sequence is generated. In block 808, the $N_p$ time samples are converted into $N_p$ frequency tones. The $N_p$ frequency tones are mapped onto the allocated random-access channel sub-carriers in block 810. Because $N_{pi}$ sub-carriers are allocated to the random-access channel, and the preamble sequence length was shortened to $N_p$ samples resulting in only $N_p$ frequency tones to be mapped onto the sub-carriers, $N_{pi}-N_p$ sub-carriers remain unused. In block 812, the unused sub-carriers are zeroed and distributed around the preamble sub-carriers to provide isolation from adjacent frequency bands. These unused sub-carriers can be potentially be re-used for cubic metric (or PAPR) reduction through either cyclic extension or tone reservation.

Figure 9:
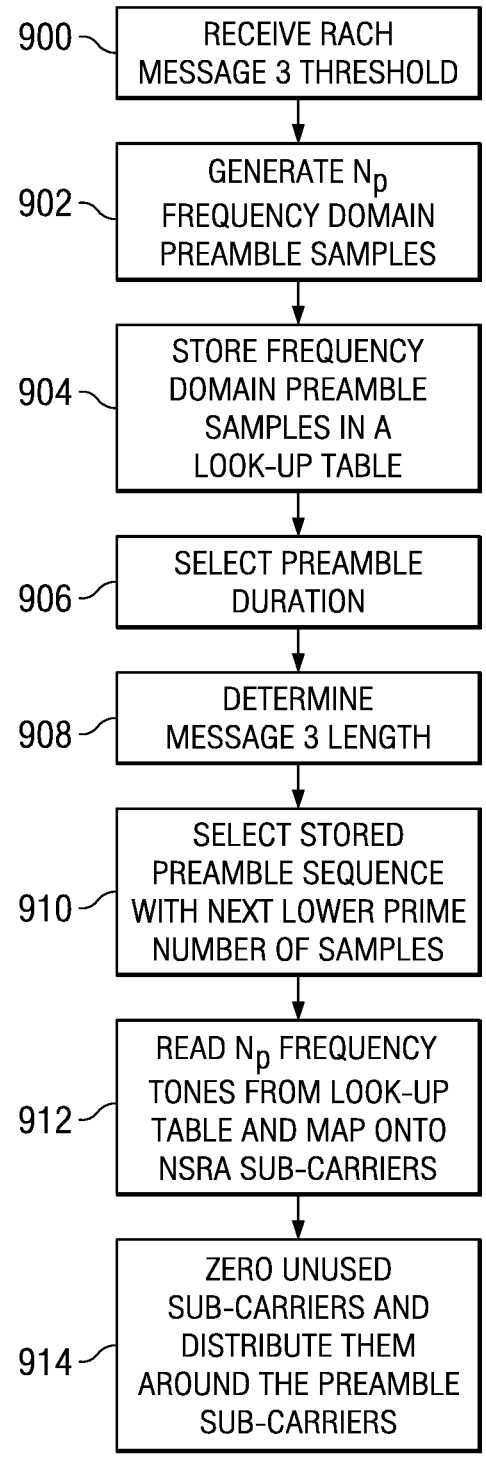
FIG. 9 shows a flow diagram of an illustrative alternative random access preamble signal length adjustment and transmission method.

FIG. 9 shows a flow diagram of an alternative method of generating a prime length sequence for use with an SC-FDMA up-link transmitter. Because the preamble sequence is deterministic, prime length preamble sequences can be predefined and stored for later use.

In block 900, a RACH message 3 threshold value encoded as a two or three bit value is received from the serving NodeB via an SIB. The threshold value is calculated by the NodeB as described with respect to equation 5.

In block 902, once configured by the Node B, the prime length preamble sequences are generated and converted into frequency domain preamble samples. In block 904, the frequency domain preamble samples are stored in a storage device to be retrieved as needed. In block 906, a random access signal transmission is initiated, and preamble duration is selected. The selected duration is an integer multiple of up-link sub-carrier data block duration, and is chosen to meet system coverage requirements.

The UE then uses the threshold value to determine block 908 its requested message 3 length as described in more detail with regard to equation 6. Since there are two choices for the message 3 length, the UE forms the preamble by selecting from one of two defined sets of sequences in order to convey the preferred message 3 size to the NodeB.

In block 910, a stored preamble sequence is selected. The selected sequence will preferably be the sequence having the number of samples immediately lower than the number of samples computed from the duration selected in block 906 and random access signal bandwidth. In block 912, the preamble frequency samples are read from the storage device and mapped onto the sub-carriers allocated to the random access channel. Because more sub-carriers are allocated to the random access channel than there are preamble frequency samples, unused sub-carriers are zeroed and distributed in block 914 around the preamble sub-carriers to provide isolation from adjacent frequency bands. This alternate implementation allows omission of the frequency domain transforming component 402 from the random access preamble transmitter. The preamble samples are frequency domain transformed only once, prior to storage, and therefore the transform process is not concerned with the latency requirements of the random access preamble transmitter, and can be implemented in a simpler and less costly manner. It should be further noted that frequency domain transforming component 402 can be totally eliminated if the preamble root sequence is configured directly in frequency representation by the Node B. However, because the preamble sequence is defined to be a Cyclic Shifted Zadoff-Chu sequence, the cyclic shift must still be implemented. The cyclic shift may be performed at the system sampling rate before cyclic prefix insertion 410.

For orthogonal multiplexing in Orthogonal Frequency Division Multiplexed ("OFDM") systems, each tone carries a modulated symbol according to a frequency overlapped time limited orthogonal structure. The frequency tones overlap with each other so that in the center of a tone, the spectral envelopes of all surrounding tones are null. This principle allows multiplexing of different transmissions in the same system bandwidth in an orthogonal manner. However, this only holds true if the sub-carrier spacing $6f$ is kept constant. $5f$ is equal to the inverse of the OFDM symbol duration T, used to generate the frequency tones by DFT. Because the preamble OFDM symbol is longer than the data OFDM symbol, the sub-carrier spacing of the preamble OFDM symbol will be shorter than the sub-carrier spacing of the data OFDM symbol. In addition, since data and preamble OFDM symbols are neither aligned nor have same durations, strict orthogonality cannot be achieved. However, the following design rules aim at minimizing the co-interference between preamble and data OFDM symbols: 1) fixing the preamble OFDM symbol duration to an integer multiple of the data symbol duration provides some commensurability between preamble and data sub-carriers thus providing interference reduction between these sub-carriers, and 2) this also assumes that the preamble sampling frequency is an integer multiple of the data symbol sub-carrier spacing.

In OFDM systems, different UEs' transmissions are dynamically allocated to different non overlapping frequency bands. This allocation is generally based on a minimum frequency granularity, called a resource block (RB). In order to facilitate the frequency multiplexing of the random access preamble and the data transmission, the preamble should be allocated an integer number of resource blocks In addition to the detection process, random access preamble 304 allows base station 101 to analyze the frequency response of up-link 111, over a range of frequencies within the preamble bandwidth. Characterization of up-link 111 frequency response allows base station 101 to tailor the narrow band up-link 111 resources allocated to UE 109 within the preamble bandwidth to match up-link 111 frequency response, resulting in more efficient utilization of up-link resource.

System Example

Figure 10:
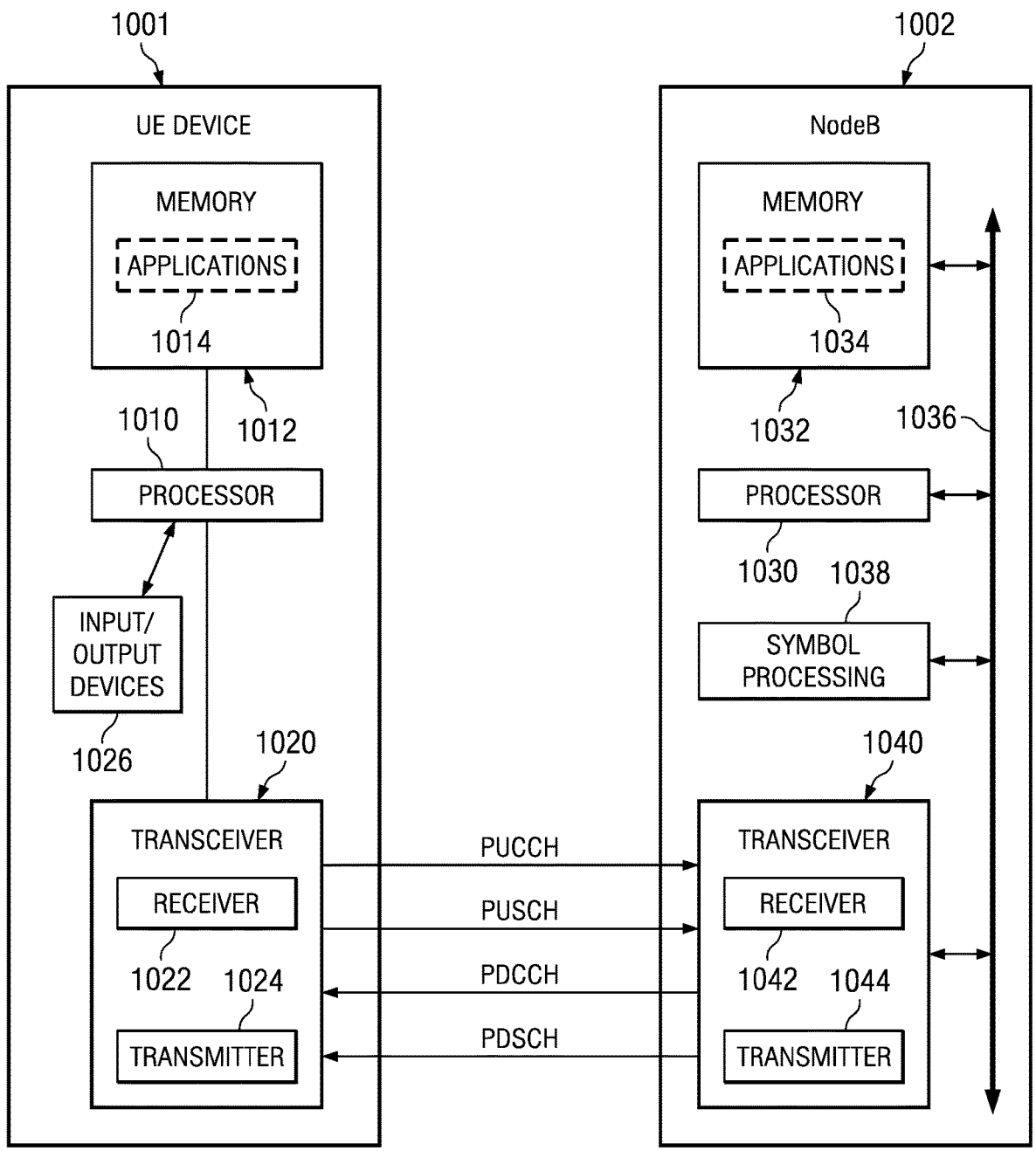
FIG. 10 is a block diagram of an exemplary UE and NodeB for use in the network of FIG. 1.

FIG. 10 is a block diagram illustrating operation of a NodeB 1002 and a mobile UE 1001 in the network system of FIG. 1. The mobile UE device 1001 may represent any of a variety of devices such as a server, a desktop computer, a laptop computer, a cellular phone, a Personal Digital Assistant (PDA), a smart phone or other electronic devices. In some embodiments, the electronic mobile UE device 1001 communicates with the NodeB 1002 based on a LTE or E-UTRAN protocol. Alternatively, another communication protocol now known or later developed can be used.

As shown, the mobile UE device 1001 comprises a processor 1010 coupled to a memory 1012 and a Transceiver 1020. The memory 1012 stores (software) applications 1014 for execution by the processor 1010. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 1001 to transmit UL signals to the NodeB (base-station) 1002 periodically or continuously via the transceiver 1020. In at least some embodiments, the mobile UE device 1001 identifies a Quality of Service (QoS) requirement when requesting an uplink resource from the NodeB 1002. In some cases, the QoS requirement may be implicitly derived by the NodeB 1002 from the type of traffic supported by the mobile UE device 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the Uplink Logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of the mobile UE during a call process. The display may also display pictures received from the network, from a local camera, or from other sources such as a USB connector. Processor 1010 may also send a video stream to the display that is received from various sources such as the cellular network via RF transceiver 1022 or the camera.

During transmission and reception of voice data or other application data, transmitter 1024 may be or become non-synchronized with its serving NodeB. In this case, it sends a random access signal as described in more detail with respect to FIGS. 2-9. As part of this procedure, it determines a preferred size for the next data transmission, referred to as message 3, by using a power threshold value provided by the serving NodeB, as described in more detail above. In this embodiment, the message 3 preferred size determination is embodied by executing instructions stored in memory 1012 by processor 1010. In other embodiments, the message 3 size determination may be embodied by a separate processor/memory unit, by a hardwired state machine, or by other types of control logic, for example.

NodeB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct the base-station to manage transmissions to or from the user device 1001.

Transceiver 1040 comprises an uplink Resource Manager, which enables the NodeB 1002 to selectively allocate uplink PUSCH resources to the user device 1001. As would be understood by one of skill in the art, the components of the uplink resource manager may involve the physical (PHY) layer and/or the Media Access Control (MAC) layer of the transceiver 1040. Transceiver 1040 includes a Receiver(s) 1042 for receiving transmissions from various UE within range of the NodeB and transmitter(s) 1044 for transmitting data and control information to the various UE within range of the NodeB.

The uplink resource manager executes instructions that control the operation of transceiver 1040. Some of these instructions may be located in memory 1032 and executed when needed on processor 1030. The resource manager controls the transmission resources allocated to each UE that is being served by NodeB 1002 and broadcasts control information via the physical downlink control channel PDCCH.

Symbol processing circuitry 1038 performs demodulation using known techniques. Random access signals are demodulated in symbol processing circuitry 1038 as described in more detail above with regard to FIG. 7.

During transmission and reception of voice data or other application data, receiver 1042 may receive a random access signal from a UE, as described in more detail above. The random access signal is encoded to request a message 3 size that is preferred by the UE. The UE determines the preferred message 3 size by using a message 3 threshold provided by the NodeB. In this embodiment, the message 3 threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message 3 threshold is a fixed value that may be stored in memory 1032, for example. In response to receiving the message 3 size request, the NodeB schedules an appropriate set of resources and notifies the UE with a resource grant.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, more than two message 3 sizes may be allowed and encoded in the RA preamble.

Embodiments of the described invention applies to any systems where random access signaling is implemented, including but not limited to TDD, FDD, and HD-FDD systems.

The term "frame" and "subframe" are not restricted to the structure of FIG. 2 and FIG. 3. Other configurations of frames and/or subframes may be embodied. In general, the term "frame" may refer to a set of one or more subframes. A transmission instance likewise refers to a frame, subframe, or other agreed upon quantity of transmission resource.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

APPENDIX A messagePowerOffsetGroupB = $\Delta$TF + 10log10($N_{RB}$) + margin(=0) (dB)

$N_{sc}^{RB}$ 12
$N_{symb}^{PUSCH}$ 6

$N_{RB}$ 1 0 dB
Nre 144

| $I_{TBS}$ | Mod | msg3 | TBS | MPR | ΔTF (dB) | messagePower-OffsetGroupB (dB) |
|---|---|---|---|---|---|---|
| 0 | 2 | | 16 | 0.11 | −9.95 | −9.95 |
| 1 | 2 | | 24 | 0.17 | −8.09 | −8.09 |
| 2 | 2 | | 32 | 0.22 | −6.73 | −6.73 |
| 3 | 2 | | 40 | 0.28 | −5.65 | −5.65 |
| 4 | 2 | | 56 | 0.39 | −3.97 | −3.97 |
| 5 | 2 | | 72 | 0.50 | −2.66 | −2.66 |
| 6 | 2 | | na | | | |
| 7 | 2 | | 104 | 0.72 | −0.61 | −0.61 |
| 8 | 2 | | 120 | 0.83 | 0.25 | 0.25 |
| 9 | 2 | | 136 | 0.94 | 1.03 | 1.03 |
| 10 | 2/4 | | 144 | 1.00 | 1.39 | 1.39 |
| 11 | 4 | | 176 | 1.22 | 2.75 | 2.75 |
| 12 | 4 | | 208 | 1.44 | 3.97 | 3.97 |
| 13 | 4 | | 224 | 1.56 | 4.55 | 4.55 |
| 14 | 4 | | 256 | 1.78 | 5.64 | 5.64 |
| 15 | 4/6 | | 280 | 1.94 | 6.43 | 6.43 |

$N_{RB}$ 2 3.01 dB
Nre 288

| $I_{TBS}$ | Mod | msg3 | TBS | MPR | ΔTF (dB) | messagePower-OffsetGroupB (dB) |
|---|---|---|---|---|---|---|
| 0 | 2 | | 32 | 0.11 | −9.95 | −6.94 |
| 1 | 2 | | 56 | 0.19 | −7.36 | −4.35 |
| 2 | 2 | | 72 | 0.25 | −6.16 | −3.15 |
| 3 | 2 | | 104 | 0.36 | −4.35 | −1.34 |
| 4 | 2 | | 120 | 0.42 | −3.62 | −0.61 |
| 5 | 2 | | 144 | 0.50 | −2.66 | 0.35 |
| 6 | 2 | | 176 | 0.61 | −1.56 | 1.45 |
| 7 | 2 | | 224 | 0.78 | −0.17 | 2.84 |
| 8 | 2 | | 256 | 0.89 | 0.65 | 3.66 |
| 9 | 2 | | 286 | 0.99 | 1.35 | 4.36 |
| 10 | 2/4 | | 328 | 1.14 | 2.26 | 5.27 |
| 11 | 4 | | 376 | 1.31 | 3.22 | 6.23 |
| 12 | 4 | | 440 | 1.53 | 4.40 | 7.42 |
| 13 | 4 | | 488 | 1.69 | 5.24 | 8.25 |
| 14 | 4 | | 552 | 1.92 | 6.30 | 9.31 |
| 15 | 4/6 | | 600 | 2.08 | 7.06 | 10.07 |

$N_{RB}$ 3 4.77 dB
Nre 432

| $I_{TBS}$ | Mod | msg3 | TBS | MPR | ΔTF (dB) | messagePower-OffsetGroupB (dB) |
|---|---|---|---|---|---|---|
| 0 | 2 | | 56 | 0.13 | −9.25 | −4.48 |
| 1 | 2 | | 88 | 0.20 | −7.14 | −2.37 |
| 2 | 2 | | 144 | 0.33 | −4.75 | 0.02 |
| 3 | 2 | | 176 | 0.41 | −3.73 | 1.04 |
| 4 | 2 | | 208 | 0.48 | −2.86 | 1.91 |
| 5 | 2 | | 224 | 0.52 | −2.46 | 2.31 |
| 6 | 2 | | 256 | 0.59 | −1.73 | 3.04 |
| 7 | 2 | | 328 | 0.76 | −0.31 | 4.46 |

APPENDIX A-continued messagePowerOffsetGroupB = ΔTF + 10log10($N_{RB}$) + margin(=0) (dB)

$N_{sc}^{RB}$ 12  
$N_{symb}^{PUSCH}$ 6

| $I_{TBS}$ | Mod | msg3 | TBS | MPR | ΔTF (dB) | messagePower-OffsetGroupB (dB) |
|---|---|---|---|---|---|---|
| 8 | 2 | | 392 | 0.91 | 0.77 | 5.55 |
| 9 | 2 | | 456 | 1.06 | 1.75 | 6.52 |
| 10 | 2/4 | | 504 | 1.17 | 2.43 | 7.20 |
| 11 | 4 | | 584 | 1.35 | 3.48 | 8.25 |
| 12 | 4 | | 680 | 1.57 | 4.64 | 9.41 |
| 13 | 4 | | 744 | 1.72 | 5.37 | 10.15 |
| 14 | 4 | | 840 | 1.94 | 6.43 | 11.20 |
| 15 | 4/6 | | 904 | 2.09 | 7.10 | 11.87 |

$N_{RB}$ 4 6.02 dB  
Nre 576

| $I_{TBS}$ | Mod | msg3 | TBS | MPR | ΔTF (dB) | messagePower-OffsetGroupB (dB) |
|---|---|---|---|---|---|---|
| 0 | 2 | | 88 | 0.15 | -8.49 | -2.47 |
| 1 | 2 | | 144 | 0.25 | -6.16 | -0.14 |
| 2 | 2 | | 176 | 0.31 | -5.18 | 0.84 |
| 3 | 2 | | 208 | 0.36 | -4.35 | 1.67 |
| 4 | 2 | | 256 | 0.44 | -3.28 | 2.74 |
| 5 | 2 | | 328 | 0.57 | -1.95 | 4.07 |
| 6 | 2 | | 392 | 0.68 | -0.95 | 5.07 |
| 7 | 2 | | 472 | 0.82 | 0.15 | 6.17 |
| 8 | 2 | | 536 | 0.93 | 0.93 | 6.95 |
| 9 | 2 | | 616 | 1.07 | 1.84 | 7.86 |
| 10 | 2/4 | | 680 | 1.18 | 2.51 | 8.53 |
| 11 | 4 | | 776 | 1.35 | 3.45 | 9.47 |
| 12 | 4 | | 904 | 1.57 | 4.62 | 10.64 |
| 13 | 4 | | 1000 | 1.74 | 5.44 | 11.46 |
| 14 | 4 | | 1128 | 1.96 | 6.49 | 12.51 |
| 15 | 4/6 | | 1224 | 2.13 | 7.25 | 13.27 |

$N_{RB}$ 5 6.99 dB  
Nre 720

| $I_{TBS}$ | Mod | msg3 | TBS | MPR | ΔTF (dB) | messagePower-OffsetGroupB (dB) |
|---|---|---|---|---|---|---|
| 0 | 2 | | 120 | 0.17 | -8.09 | -1.10 |
| 1 | 2 | | 176 | 0.24 | -6.27 | 0.72 |
| 2 | 2 | | 208 | 0.29 | -5.46 | 1.53 |
| 3 | 2 | | 256 | 0.36 | -4.43 | 2.56 |
| 4 | 2 | | 328 | 0.46 | -3.15 | 3.84 |
| 5 | 2 | | 424 | 0.59 | -1.77 | 5.22 |
| 6 | 2 | | 504 | 0.70 | -0.79 | 6.20 |
| 7 | 2 | | 584 | 0.81 | 0.08 | 7.07 |
| 8 | 2 | | 680 | 0.94 | 1.03 | 8.02 |
| 9 | 2 | | 776 | 1.08 | 1.89 | 8.88 |
| 10 | 2/4 | | 872 | 1.21 | 2.69 | 9.67 |
| 11 | 4 | | 1000 | 1.39 | 3.68 | 10.67 |
| 12 | 4 | | 1128 | 1.57 | 4.60 | 11.59 |
| 13 | 4 | | 1256 | 1.74 | 5.48 | 12.47 |
| 14 | 4 | | 1416 | 1.97 | 6.53 | 13.52 |
| 15 | 4/6 | | 1544 | 2.14 | 7.33 | 14.32 |

APPENDIX B

Power control of Msg3

$P_{Msg3} = \min\{P_{max}; 10\log10(N_{RB}) + Po\_pre + \Delta_{Preamble\_msg3} + PL + \Delta_{TF} + \Delta_{prampup}(=0) + \delta msg2(=0)\}$

| UE-eNB distance (km) | 1 | 1.5 | 2 | 2.5 | 3 | 3.5 | 4 | 4.5 | 5 |
|---|---|---|---|---|---|---|---|---|---|
| Pathloss (dB) | 125.492 | 131.6948 | 136.095786 | 139.5094 | 142.2986 | 144.6568 | 146.6995 | 148.5014 | 150.1132 |

Msg3 Allocation  
$N_{RB-Msg3} = 1$

| Modulation TBS | $P_{Msg3}$ (dBm) | | | | | | | | |
|---|---|---|---|---|---|---|---|---|---|
| QPSK 104 | 0.487073 | 6.689862 | 11.0908111 | 14.50445 | 17.2936 | 19.65179 | 21.69455 | 23 | 23 |
| QPSK 120 | 1.340903 | 7.543692 | 11.9446415 | 15.35828 | 18.14743 | 20.50562 | 22.54838 | 23 | 23 |
| QPSK 136 | 2.1201 | 8.322889 | 12.7238377 | 16.13748 | 18.92663 | 21.28462 | 23 | 23 | 23 |
| QPSK/16QAM 144 | 2.487363 | 8.690153 | 13.0911017 | 16.50474 | 19.29389 | 21.65208 | 23 | 23 | 23 |
| 16QAM 176 | 3.843023 | 10.04581 | 14.4467612 | 17.8604 | 20.64955 | 23 | 23 | 23 | 23 |
| 16QAM 208 | 5.065381 | 11.26817 | 15.6691191 | 19.08276 | 21.87191 | 23 | 23 | 23 | 23 |
| 16QAM 224 | 5.640331 | 11.84312 | 16.2440367 | 19.65771 | 22.44686 | 23 | 23 | 23 | 23 |
| 16QAM 256 | 6.735828 | 12.93842 | 17.3393664 | 20.75301 | 23 | 23 | 23 | 23 | 23 |
| 16QAM/64QAM 280 | 7.51921 | 13.722 | 18.1229484 | 21.53659 | 23 | 23 | 23 | 23 | 23 |

$N_{RB-Msg3} = 2$

| Modulation TBS | $P_{Msg3}$ (dBm) | | | | | | | | |
|---|---|---|---|---|---|---|---|---|---|
| QPSK 104 | -0.24526 | 5.957526 | 10.3584753 | 13.77212 | 16.56126 | 18.91946 | 20.96221 | 22.76405 | 23 |
| QPSK 120 | 0.486599 | 6.689388 | 11.0903374 | 14.50398 | 17.29313 | 19.65132 | 21.69408 | 23 | 23 |
| QPSK 144 | 1.445548 | 7.648337 | 12.049286 | 15.46293 | 18.25208 | 20.61027 | 22.65302 | 23 | 23 |
| QPSK 176 | 2.542804 | 8.745593 | 13.1465423 | 16.56018 | 19.34933 | 21.70752 | 23 | 23 | 23 |
| QPSK 224 | 3.934985 | 10.13777 | 14.5387236 | 17.95236 | 20.74151 | 23 | 23 | 23 | 23 |
| QPSK 256 | 4.748893 | 10.95168 | 15.3526313 | 18.78627 | 21.55542 | 23 | 23 | 23 | 23 |
| QPSK 286 | 5.452476 | 11.65527 | 16.0562143 | 19.46986 | 22.259 | 23 | 23 | 23 | 23 |
| QPSK/16QAM 328 | 6.363575 | 12.56636 | 16.967313 | 20.38095 | 23 | 23 | 23 | 23 | 23 |
| 16QAM 376 | 7.32462 | 13.52741 | 17.9283583 | 21.342 | 23 | 23 | 23 | 23 | 23 |
| 16QAM 440 | 8.508812 | 14.7116 | 19.1125507 | 22.52619 | 23 | 23 | 23 | 23 | 23 |
| 16QAM 488 | 9.342741 | 15.54553 | 19.946479 | 23 | 23 | 23 | 23 | 23 | 23 |
| 16QAM 552 | 10.40083 | 16.60362 | 21.004564 | 23 | 23 | 23 | 23 | 23 | 23 |
| 16QAM/64QAM 600 | 11.16285 | 17.36564 | 21.7655848 | 23 | 23 | 23 | 23 | 23 | 23 |

APPENDIX B-continued

| Power control of Msg3 | | | | | | | | | |
|---|---|---|---|---|---|---|---|---|---|
| $N_{RB\text{-}Msg3} = 3$ | | | | | | | | | |
| Modulation TBS | | | | $P_{Msg3}$ (dBm) | | | | | |
| QPSK 144 | 1.11315 | 7.315939 | 11.7168882 | 15.13053 | 17.91968 | 20.27787 | 22.32063 | 23 | 23 |
| QPSK 176 | 2.131458 | 8.334248 | 12.7351966 | 16.14884 | 18.93799 | 21.29618 | 23 | 23 | 23 |
| QPSK 208 | 3.005253 | 9.208042 | 13.6089913 | 17.02263 | 19.81178 | 22.16997 | 23 | 23 | 23 |
| QPSK 224 | 3.401798 | 9.604588 | 14.0055367 | 17.41918 | 20.20833 | 22.56652 | 23 | 23 | 23 |
| QPSK 256 | 4.132221 | 10.33501 | 14.7359594 | 18.1496 | 20.93875 | 23 | 23 | 23 | 23 |
| QPSK 328 | 5.552564 | 11.75535 | 16.156302 | 19.56994 | 22.35909 | 23 | 23 | 23 | 23 |
| QPSK 392 | 6.63867 | 12.84146 | 17.2424077 | 20.65605 | 23 | 23 | 23 | 23 | 23 |
| QPSK 456 | 7.613223 | 13.81601 | 18.2169613 | 21.6306 | 23 | 23 | 23 | 23 | 23 |
| QPSK/16QAM 504 | 8.289963 | 14.49275 | 18.8937007 | 22.30734 | 23 | 23 | 23 | 23 | 23 |
| 16QAM 584 | 9.340328 | 15.54312 | 19.9440566 | 23 | 23 | 23 | 23 | 23 | 23 |
| 16QAM 680 | 10.50542 | 16.70821 | 21.1091615 | 23 | 23 | 23 | 23 | 23 | 23 |
| 16QAM 744 | 11.23898 | 17.44177 | 21.8427174 | 23 | 23 | 23 | 23 | 23 | 23 |
| 16QAM 840 | 12.29042 | 18.49321 | 22.8941609 | 23 | 23 | 23 | 23 | 23 | 23 |
| 16QAM/64QAM 904 | 12.96543 | 19.16822 | 23 | 23 | 23 | 23 | 23 | 23 | 23 |
| $N_{RB\text{-}Msg3} = 4$ | | | | | | | | | |
| Modulation TBS | | | | $P_{Msg3}$ (dBm) | | | | | |
| QPSK 144 | 0.949767 | 7.152556 | 11.5535053 | 14.96715 | 17.75629 | 20.11449 | 22.15724 | 23 | 23 |
| QPSK 176 | 1.929982 | 8.132771 | 12.53372 | 15.94736 | 16.73651 | 21.0947 | 23 | 23 | 23 |
| QPSK 208 | 2.765037 | 8.967826 | 13.3687753 | 16.78242 | 19.57156 | 21.92976 | 23 | 23 | 23 |
| QPSK 256 | 3.83269 | 10.03548 | 14.4364286 | 17.85007 | 20.63922 | 22.99741 | 23 | 23 | 23 |
| QPSK 328 | 5.161369 | 11.36416 | 15.7651076 | 19.17875 | 21.9679 | 23 | 23 | 23 | 23 |
| QPSK 392 | 6.163315 | 12.3661 | 16.7670536 | 20.18069 | 22.96984 | 23 | 23 | 23 | 23 |
| QPSK 472 | 7.259288 | 13.46208 | 17.8630259 | 21.27667 | 23 | 23 | 23 | 23 | 23 |
| QPSK 536 | 8.046728 | 14.24952 | 18.6504661 | 22.06411 | 23 | 23 | 23 | 23 | 23 |
| QPSK 616 | 8.949467 | 15.15226 | 19.5532049 | 22.96685 | 23 | 23 | 23 | 23 | 23 |
| QPSK/16QAM 680 | 9.621231 | 15.82402 | 20.2249696 | 23 | 23 | 23 | 23 | 23 | 23 |
| 16QAM 776 | 10.56445 | 16.76724 | 21.168185 | 23 | 23 | 23 | 23 | 23 | 23 |
| 16QAM 904 | 11.73139 | 17.93418 | 22.3351278 | 23 | 23 | 23 | 23 | 23 | 23 |
| 16QAM 1000 | 12.55567 | 18.75846 | 23 | 23 | 23 | 23 | 23 | 23 | 23 |
| 16QAM 1128 | 13.60389 | 19.80668 | 23 | 23 | 23 | 23 | 23 | 23 | 23 |
| 16QAM/64QAM 1224 | 14.36014 | 20.56293 | 23 | 23 | 23 | 23 | 23 | 23 | 23 |
| $N_{RB\text{-}Msg3} = 5$ | | | | | | | | | |
| Modulation TBS | | | | $P_{Msg3}$ (dBm) | | | | | |
| QPSK 120 | −0.00355 | 6.199243 | 10.6001922 | 14.01383 | 16.80298 | 19.16117 | 21.20393 | 23 | 23 |
| QPSK 176 | 1.810444 | 8.013233 | 12.4141818 | 15.82782 | 18.61697 | 20.97516 | 23 | 23 | 23 |
| QPSK 208 | 2.622787 | 8.825576 | 13.226525 | 16.64017 | 19.42931 | 21.78751 | 23 | 23 | 23 |
| QPSK 256 | 3.655811 | 9.8585 | 14.2595492 | 17.67319 | 20.46234 | 22.82053 | 23 | 23 | 23 |
| QPSK 328 | 4.931289 | 11.13408 | 15.5350273 | 18.94867 | 21.73782 | 23 | 23 | 23 | 23 |
| QPSK 424 | 6.31592 | 12.51871 | 16.9196582 | 20.3333 | 23 | 23 | 23 | 23 | 23 |
| QPSK 504 | 7.294969 | 13.49776 | 17.8987069 | 21.31235 | 23 | 23 | 23 | 23 | 23 |
| QPSK 584 | 8.166487 | 14.36928 | 18.770225 | 22.18387 | 23 | 23 | 23 | 23 | 23 |
| QPSK 680 | 9.1098 | 15.31259 | 19.7135378 | 23 | 23 | 23 | 23 | 23 | 23 |
| QPSK 776 | 9.970352 | 16.17314 | 20.57409 | 23 | 23 | 23 | 23 | 23 | 23 |
| QPSK/16QAM 872 | 10.76855 | 16.97134 | 21.3722879 | 23 | 23 | 23 | 23 | 23 | 23 |
| 16QAM 1000 | 11.75936 | 17.96215 | 22.363097 | 23 | 23 | 23 | 23 | 23 | 23 |
| 16QAM 1126 | 12.68642 | 18.88921 | 23 | 23 | 23 | 23 | 23 | 23 | 23 |
| 16QAM 1256 | 13.56505 | 19.76784 | 23 | 23 | 23 | 23 | 23 | 23 | 23 |
| 16QAM 1416 | 14.61135 | 20.81414 | 23 | 23 | 23 | 23 | 23 | 23 | 23 |
| 16QAM/64QAM 1544 | 15.41606 | 21.61685 | 23 | 23 | 23 | 23 | 23 | 23 | 23 |

Pathloss model:
% 1) Okumura-Hata empirical distance-dependent path loss model defined in:
% M. Shafi, S. Ogose and T. Hattori, Wireless Communications in the 21st Century, IEEE press, Wiley-Interscience, 2002
pl = 69.55 + 26.16*log10(f) − 13.82*log10(hb) − (3.2*(log10(11.75*hm))^2− 4.97) + (44.9 − 6.55*log10(hb))*log10(d) − (29 − 19*log10(alpha));
% k(hm) is the correction factor for UE antenna height
% alpha: The ground cover factor alpha is defined as the percentage of the area covered by buildings.
% f is the carrier frequency (MHz). Range: 400-2200 MHz
% hb is the Node-B antenna height (m). Range: 30-200 m
% hm is UE antenna height in meters (m). Range: 1-10 m
% d is the distance between Range: 1-20 km
%
% A typical configuration is:
% f = 2000 MHz,
% hb = 30/50 m,
% hm = 1.5 m, 1.5
% alpha = 10%
% 2) TR25.814; 128.1 + 37.6log10(r); r in km APPENDIX B-continued Power control of Msg3

| | | Parameters | | | |
|---|---|---|---|---|---|
| | Name | Value | Unit | Range | Meaning |
| 1) Pathloss and link budget | Type | Okumura | NA | 25.814 or Okumura | Type of pathloss model used |
| | Nrx | 5 | dB | | Receiver Noise Figure |
| | LF | 0 | dB | [0, 8] | Log-Normal Fade Margin |
| | Pl | 0 | dB | [0, 20] | Penetration loss |
| | f | 2000 | MHz | | Carrier frequency |
| | hm | 1.5 | m | | UE height |
| | alpha | 10 | % | | |
| | hb | 30 | m | | eNB antenna height |
| | $T_K$ | 308.15 | ° K | | Temperature (308.15° K = 35° C.) |
| | K | 1.38E-23 | | | Boltzmann constant |
| | $N_0$ | -173.71 | dBm/Hz | | Noise Power Density |
| | N | -108.38 | dBm | | Noise Power |
| | I | 3.00 | dB | | Interference margin |
| | $E_P/N_0$ | 18 | dB | | Target (total) preamble energy to noise density ratio |
| | $E_s/N_0(=C/N)$ | -11.2376 | dB | | Target preamble subcarrier energy to noise density ratio at eNB antenna port |
| 2) Power control | Pmax | 23 | dBm | [-40, 23] | UE max transmit power |
| | $P_{o\_pre}$ | -116.62 | dBm | [-120, -90] | Received preamble power at antenna port $P_{o\_pre\_min}$ -120 dBm |
| | ΔPreamble_Msg3 | -7.78 | dB | | |

What is claimed is:

1. A method for selecting a transport block size (TBS) of a first uplink message (RACH Msg3) transmitted on a Physical Uplink Shared Channel (PUSCH) during a random access procedure in a User Equipment (UE) accessing a radio access network, comprising:
receiving a pathloss threshold parameter;
estimating a downlink pathloss value indicative of radio link conditions between the UE and a base station (eNB) serving the UE;
selecting from a set of TBS values a smaller value of TBS if the determined pathloss value is greater than an operating power level of the UE minus the pathloss threshold parameter; and
sending a random access preamble based on the selected TBS.

2. The method of claim 1, wherein the pathloss threshold parameter is received from the eNB serving the UE.

3. The method of claim 1, wherein the smaller value of TBS is selected from the set of TBS values if the TBS required to transmit the RACH Msg3 does not exceed the smaller value, regardless of the pathloss value.

4. The method of claim 1, wherein a larger value of TBS is selected from the set of TBS values if the pathloss value is less than the operating power level of the UE minus the pathloss threshold parameter and the TBS required to transmit the RACH Msg3 exceeds the smaller TBS value.

5. The method of claim 1, wherein the TBS is selected from a set of two possible values.

6. The method of claim 1, wherein the operating power level of the UE is Pmax-$P_{0\_PRE}$-DELTA_PREAMBLE_MSG3;
wherein the pathloss is the downlink pathloss value estimate calculated in the UE;
wherein Pmax is the maximum allowed transmission power;
wherein $P_{0\_PRE}$ is the initial target received preamble power at the serving eNB antenna port;
wherein DELTA_PREAMBLE_MSG3 is the offset between RACH preamble and the RACH Msg3; and
wherein the pathloss threshold parameter is configured by the network.

7. The method of claim 6, wherein the parameters Pmax, $P_{0\_PRE}$ and DELTA_PREAMBLE_MSG3, are configured by the network and broadcasted as system information on a broadcast channel.

8. The method of claim 7, wherein the parameters Pmax, $P_{0\_PRE}$ and DELTA_PREAMBLE_MSG3 are also used to set the transmission power Pmsg3 of RACH Msg3 as follows:

Pmsg3=min {$P$ max; 10 log 10(NRB)+$P_{0\_PRE}$+DELTA_PREAMBLE_MSG3+PL+Δ$P$;

wherein NRB is the size of a frequency allocation in resource blocks (RB) for RACH Msg3, PL is the downlink pathloss estimate determined by the UE and ΔP is an optional adjustment factor accounting for various contributors such as power rampup of the preamble during potential retries and MCS-dependent power offset.

9. The method of claim 6, wherein the threshold parameter is computed at the eNB as follows:

THRESHOLD=$Δ_{TF\_B}$+10 log$_{10}$($N_{RB\_B}$)+margin wherein $N_{RB-B}$ is the size of a frequency allocation in resource blocks (RB) for the RACH Msg3 associated with the larger TBS value;
wherein ΔTF-B is a MCS-dependent power offset in use with the RACH Msg3 associated with the larger TBS value; and
wherein the margin value is a parameter the network uses to tune the conservativeness of the selection process, allowing minimizing the rate of erroneous selection of the larger TBS value.

10. The method of claim 9, wherein the threshold parameter is coded on three bits and broadcasted as system information on the broadcast channel.

11. The method of claim 10, wherein the threshold parameter is mapped on the three bit field, such that:
a field value of 0 indicates a parameter value (dB) of -∞,
a field value of 1 indicates a parameter value (dB) of 0, a field value of 2 indicates a parameter value (dB) of 3,
a field value of 3 indicates a parameter value (dB) of 6,
a field value of 4 indicates a parameter value (dB) of 9,
a field value of 5 indicates a parameter value (dB) of 12,
a field value of 6 indicates a parameter value (dB) of 15, and
a field value of 7 indicates a parameter value (dB) of 18.

12. A method for selecting a transport block size (TBS) of a first uplink message (RACH Msg3) transmitted on a Physical Uplink Shared Channel (PUSCH) during a random access procedure in a User Equipment (UE) accessing a radio access network, comprising:
determining a pathloss threshold parameter by a base station (eNB) serving the UE;
broadcasting the pathloss threshold parameter to a UE being served by the eNB; and
receiving a random access preamble from the UE with an indication of a selected TBS, wherein a smaller value of TBS is selected from a set of TBS values by the UE if an estimated pathloss value indicative of radio link conditions between the UE and the eNB is greater than an operating power level of the UE minus the pathloss threshold parameter.

13. The method of claim 12, wherein a larger value of TBS is selected from the set of TBS values by the UE if the pathloss value is less than the pathloss threshold parameter and the TBS required to transmit the RACH Msg3 exceeds the smaller TBS value.

14. The method of claim 13, wherein the threshold parameter is computed by the eNB as follows:

$$\text{THRESHOLD} = \Delta_{TF\_B} + 10 \log_{10}(N_{RB\_B}) + \text{margin}$$

wherein $N_{RB-B}$ is the size of a frequency allocation in resource blocks (RB) for the RACH Msg3 associated with the larger TBS value;
wherein $\Delta TF\text{-}B$ is a MCS-dependent power offset in use with the RACH Msg3 associated with the larger TBS value; and
wherein the margin value is a parameter the network uses to tune the conservativeness of the selection process, allowing minimizing the rate of erroneous selection of the larger TBS value.

15. The method of claim 14, wherein the threshold parameter is coded on three bits and broadcasted as system information on the broadcast channel.

16. The method of claim 15, wherein the threshold parameter is mapped on the three bit field, such that:
a field value of 0 indicates a parameter value (dB) of $-\infty$,
a field value of 1 indicates a parameter value (dB) of 0,
a field value of 2 indicates a parameter value (dB) of 3,
a field value of 3 indicates a parameter value (dB) of 6,
a field value of 4 indicates a parameter value (dB) of 9,
a field value of 5 indicates a parameter value (dB) of 12,
a field value of 6 indicates a parameter value (dB) of 15, and
a field value of 7 indicates a parameter value (dB) of 18.

17. A User Equipment (UE) apparatus for accessing a radio access network, the UE comprising:
processing logic connected to a memory;
radio frequency (RF) transmission logic coupled to the processing logic; and
RF receiver logic couple to the processing logic, the RF receiving logic configured to receive a pathloss threshold parameter; and
wherein the processing logic is configured to select a transport block size (TBS) of a first uplink message (RACH Msg3) transmitted on a Physical Uplink Shared Channel (PUSCH) during a random access procedure while the UE is accessing a radio access network by:
estimating a downlink pathloss value indicative of radio link conditions between the UE and a base station (eNB) serving the UE;
selecting from a set of TBS values a smaller value of TBS if the determined pathloss value is greater than an operating power level of the UE minus the pathloss threshold parameter; and
sending a random access preamble based on an indication of the selected TBS.

18. The UE of claim 17, wherein the processor is configured to select a larger value of TBS from the set of TBS values if the pathloss value is less than the operating power level of the UE minus the pathloss threshold parameter and the TBS required to transmit the RACH Msg3 exceeds the smaller TBS value.

19. The method of claim 18, wherein the operating power level of the UE is Pmax−$P_{0\_PRE}$−DELTA_PREAMBLE_MSG3;
wherein the pathloss is the downlink pathloss estimate calculated in the UE;
wherein Pmax is the maximum allowed transmission power;
wherein $P_{0\_PRE}$ is the initial target received preamble power at the serving eNB antenna port;
wherein DELTA_PREAMBLE_MSG3 is the offset between RACH preamble and the RACH Msg3; and
wherein the pathloss threshold parameter is received by the RF receiver.

20. The UE of claim 19, wherein the parameters Pmax, $P_{0\_PRE}$ and DELTA_PREAMBLE_MSG3 are also used by the processor to set the transmission power Pmsg3 of RACH Msg3 as follows:

Pmsg3=min {$P$ max; 10 log$_{10}$(NRB)+$P_{0\_PRE}$+DELTA_PREAMBLE_MSG3+PL+$\Delta P$;

wherein NRB is the size of a frequency allocation in resource blocks (RB) for RACH Msg3, PL is the downlink pathloss estimate determined by the UE and $\Delta P$ is an optional adjustment factor accounting for various contributors such as power rampup of the preamble during potential retries and MCS-dependent power offset.

* * * * *